US011827569B2

(12) United States Patent
Chang et al.

(10) Patent No.: US 11,827,569 B2
(45) Date of Patent: Nov. 28, 2023

(54) YTTRIUM ALUMINUM GARNET POWDER AND PROCESSES FOR SYNTHESIZING SAME

(71) Applicant: MATERION CORPORATION, Mayfield Heights, OH (US)

(72) Inventors: Sekyung Chang, Mayfield Heights, OH (US); Mario E. Cota, Mayfield Heights, OH (US); Robert E. Kusner, Mayfield Heights, OH (US); Fritz Grensing, Mayfield Heights, OH (US)

(73) Assignee: Materion Corporation, Mayfield Heights, OH (US)

( * ) Notice: Subject to any disclaimer, the term of this patent is extended or adjusted under 35 U.S.C. 154(b) by 91 days.

(21) Appl. No.: 17/587,800

(22) Filed: Jan. 28, 2022

(65) Prior Publication Data

US 2022/0242793 A1    Aug. 4, 2022

Related U.S. Application Data

(60) Provisional application No. 63/143,605, filed on Jan. 29, 2021.

(51) Int. Cl.
*C04B 35/18* (2006.01)
*C04B 35/626* (2006.01)

(52) U.S. Cl.
CPC .......... *C04B 35/18* (2013.01); *C04B 35/6262* (2013.01); *C04B 2235/3222* (2013.01); *C04B 2235/3225* (2013.01); *C04B 2235/764* (2013.01)

(58) Field of Classification Search
CPC ................ C04B 35/18; C04B 35/6262; C04B 2235/3222; C04B 2235/3225; C04B 2235/764
See application file for complete search history.

(56) References Cited

FOREIGN PATENT DOCUMENTS

| CN | 108536993 A | * | 9/2018 |
|---|---|---|---|
| CN | 108536993 A | | 9/2018 |
| CN | 111925202 A | | 11/2020 |

(Continued)

OTHER PUBLICATIONS

CN108536993A machine translation (Year: 2018).*

(Continued)

*Primary Examiner* — Karl E Group
*Assistant Examiner* — Cameron K Miller
(74) *Attorney, Agent, or Firm* — COZEN O'CONNOR

(57) ABSTRACT

A process of synthesizing a yttrium aluminum garnet (YAG) powder. The process comprises introducing powders of yttria and silica to form a powder mixture, wherein alumina is not added to the powder mixture. Milling the powder mixture in the presence of an alumina grinding media and a solvent forms a powder slurry. Processing the powder slurry forms a green compact. Calcining the green compact at a temperature of from 1100° C. to 1650° C. for greater than 8 hours in air to 50% or less theoretical density forms a YAG compact of at least 92 wt % $Y_3Al_5O_{12}$. Milling the YAG compact, without a grinding media, and drying produces the YAG powder. Processes further include introducing a dopant to the powder mixture to produce doped YAG powder.

19 Claims, 6 Drawing Sheets

(56) References Cited

FOREIGN PATENT DOCUMENTS

EP          2 397 453 A1    12/2011

OTHER PUBLICATIONS

International Application No. PCT/US2022/014353, "International Search Report and Written Opinion", dated May 9, 2022, 17 pages.
Palmero et al., "Surface and mechanical properties of transparent polycrystalline YAG fabricated by SPS", Materials Research Bulletin, vol. 48, No. 7, (Mar. 21, 2013), pp. 2589-2597.
Li et al., "Fabrication of transparent YAG ceramics by traditional solid-state-reaction method", Transactions Of Nonferrous Metals Society Of China, vol. 17, No. 1, (Jan. 1, 2007), pp. 148-153.
Li et al. "Transparent Nd:YAG Ceramics Fabricated Using Nanosized γ-Alumina and Yttria Powders", Journal Of The American Ceramic Society, Vo,I. 92, No. 1, (Jan. 1, 2009), pp. 241-244.
Huang et al., "Synthesis and characterization of yttrium aluminum garnet by high-energy ball milling", Optical Materials, Elsevier Science Publishers B.V., vol. 31, Vo. 5, (Mar. 1, 2009), pp. 716-719.

\* cited by examiner

YTTRIUM ALUMINUM GARNET POWDER AND PROCESSES FOR SYNTHESIZING SAME

PRIORITY

This application is related to and claims priority to U.S. Provisional Patent Application No. 63/143,605 filed Jan. 29, 2021, which is incorporated herein by reference.

FIELD

The present disclosure relates to the synthesis of yttrium aluminum garnet (YAG) powders, and processing methods for providing YAG powders having controlled dopant concentrations.

BACKGROUND

Yttrium aluminum garnet (YAG, yttrium aluminate, $Y_3Al_5O_{12}$) or YAG doped with appropriate ions have been used in a wide variety or application such as solid-state lasers and as phosphors in projectors, solid state illumination, heads-up displays, professional lighting, cathode ray tubes, light-emitting diodes, scintillators, among others.

Conventional methods of making YAG powders include chemical co-precipitation, mixed precipitation, glycine-nitrate, citrate, dissolving yttria in an alumina sol, amorphous foams, inductively-coupled thermal plasma synthesized, hydrothermal, nanopowder processing, microwave coupling, among others as example routes. However, the resulting powders produced by the aforementioned techniques are expensive, time consuming to manufacture, require small batch sizes, and may have environmental downsides associated with the method as well. In addition, the resulting impurity levels may be lower than required for some applications. This imposes considerable and unnecessary demands on resources.

While a multitude of methods for making YAG powders are available, the need exists for an uncomplicated, solid state powder synthesis process that provides improvements in yield and controlled levels of dopants, secondary or minor phases, and/or impurities, while also providing sinterability at lower temperatures than conventional solid state synthesized powders.

SUMMARY

In one embodiment, the disclosure relates to a process of synthesizing a yttrium aluminum garnet (YAG) powder. The process comprises mixing powders of yttria and silica to form a powder mixture. The powder mixture does not comprise alumina. The powder mixture may comprise a dopant. The process may further comprise ball milling, spray drying, compacting, calcining, and milling to form the YAG powder. Ball milling the powder mixture may be in the presence of an alumina grinding media and a solvent to form a powder slurry. Spray drying the powder slurry may form a spray dried powder. Compacting the spray dried powder to 35% or less theoretical density may form a green compact. Calcining the green compact in air to 50% or less theoretical density may form a YAG compact. Milling the YAG compact, without a grinding media, and then drying may produce the YAG powder. The yttria powder may have of purity 2N or higher, or a purity 3N or higher. The silica may be from 0.1 wt % to 0.3 wt % based upon the total weight of the powder mixture. The silica may be fumed silica. The alumina grinding media may have a purity from 95.0 to 99.8% $Al_2O_3$.

Mixing to form a powder mixture may further include a dopant comprising a lanthanide or transitional metal. The lanthanide or transitional metal may be in the form of a compound, wherein the compound is an oxide, a hydrate, a nitrate, a chloride, or combinations thereof. The lanthanide or transitional metal is ionized to +3 and may have an ionic radius equal to or less than 0.114 nm. The lanthanide or transitional metal may comprise scandium, titanium, vanadium, chromium, manganese, iron, cobalt, nickel, copper, zinc, zirconium, niobium, molybdenum, technetium, ruthenium, rhodium, palladium, silver, cadmium, lanthanum, cerium, praseodymium, neodymium, promethium, samarium, europium, gadolinium, terbium, dysprosium, holmium, erbium, thulium, ytterbium, lutetium, or combinations thereof. The lanthanide or transitional metal may be scandium, zinc, or cerium. The dopant may comprise from 10 ppm to 6 wt % based upon the total weight of the powder mixture. The dopant may be from 0.1 wt % to 5 wt % ceria based upon the total weight of the powder mixture. The dopant may be less than 3 wt % ceria based upon the total weight of the powder mixture. The dopant compound may be ceria ($CeO_2$), cerium (III) chloride heptahydrate ($CeCl_3 \cdot 7H_2O$), or cerium (III) nitrate hexahydrate ($Ce(NO_3)_3 \cdot 6H_2O$).

Ball milling the powder slurry may include the powder mixture, solvent, and the alumina grinding media being contained in a polymer lined ball milling vessel. The solvent may be distilled water or deionized water (ethyl and isopropyl alcohol). An organic binder may be added to the powder slurry prior to spray drying the powder slurry. The organic binder may be water soluble. The organic binder may be from 3 wt % to 9 wt % based upon the total weight of the powder slurry. The composition after ball milling may include stoichiometric $3Y_2O_3:5Al_2O_3$ (0.6:1) and less than 3 wt % additional $Al_2O_3$. The additional $Al_2O_3$ may include an eroded portion of the alumina grinding media.

Compacting the spray dried powder may include uni-axial pressing or cold isostatic pressing. Compacting the spray dried powder may be performed at room temperature in air. Compacting the spray dried powder may be performed at a pressure from 500 psi to 1250 psi. Calcining may be performed at a temperature of from 1100° C. to 1650° C., or from 1450° C. to 1550° C. Calcining may be performed for a time of from 2 hours to 64 hours, or from 8 hours to 16 hours. Milling the YAG compact may include the compact and a solvent being contained in a polymer lined milling vessel. The solvent may be ethanol alcohol or isopropyl alcohol. Milling the YAG compact may include milling for at least 6 hours. Milling the YAG compact may include autogenous crushing of YAG compact material upon itself to produce the YAG powder having an average particle size distribution of less than 100 μm. The average particle size distribution may be less than 63 μm, or less than 44 μm. The milled YAG compact material may be sieved before drying. The YAG powder may have a bimodal particle size distribution. Drying may be performed at a temperature less than 90° C.

In some embodiments, a process of synthesizing a doped yttrium aluminum garnet (YAG) powder comprises providing powders of yttria, silica, and at least one dopant formed of an oxide, a hydrate, a nitrate, or a chloride of a lanthanide or transitional metal and mixing to form a powder mixture, wherein alumina is not added to the powder mixture. The process may further comprise ball milling the powder mixture in the presence of an alumina grinding media and a solvent to form a powder slurry, adding an organic binder to the powder slurry and mixing to form a sprayable powder slurry, and spray drying the sprayable powder slurry to form a spray dried powder. The process may further comprise compacting the spray dried powder to 35% or less theoretical density to form a green compact. The process may further comprise calcining the green compact in air to 50% or less theoretical density to form a YAG compact. The process may include where the yttrium aluminum garnet compact is at least 92 wt % $Y_3Al_5O_{12}$ or greater. The process may further comprise milling the YAG compact, without a grinding media, and then drying to produce a doped YAG powder.

In aspects, a yttrium aluminum garnet (YAG) composition comprises $Y_3Al_5O_{12}$ and less than 3 wt % additional $Al_2O_3$, wherein the additional $Al_2O_3$ includes an eroded portion of an alumina grinding media. The composition may further include a dopant concentration of at least 1 at %. An article, such as a phosphor wheel, may comprise the yttrium aluminum garnet (YAG) composition as described above.

BRIEF DESCRIPTION OF THE DRAWINGS

A further understanding of the nature and advantages of the disclosed technology may be realized by reference to the remaining portions of the specification and the drawings.

DETAILED DESCRIPTION

Introduction

Figure 1:
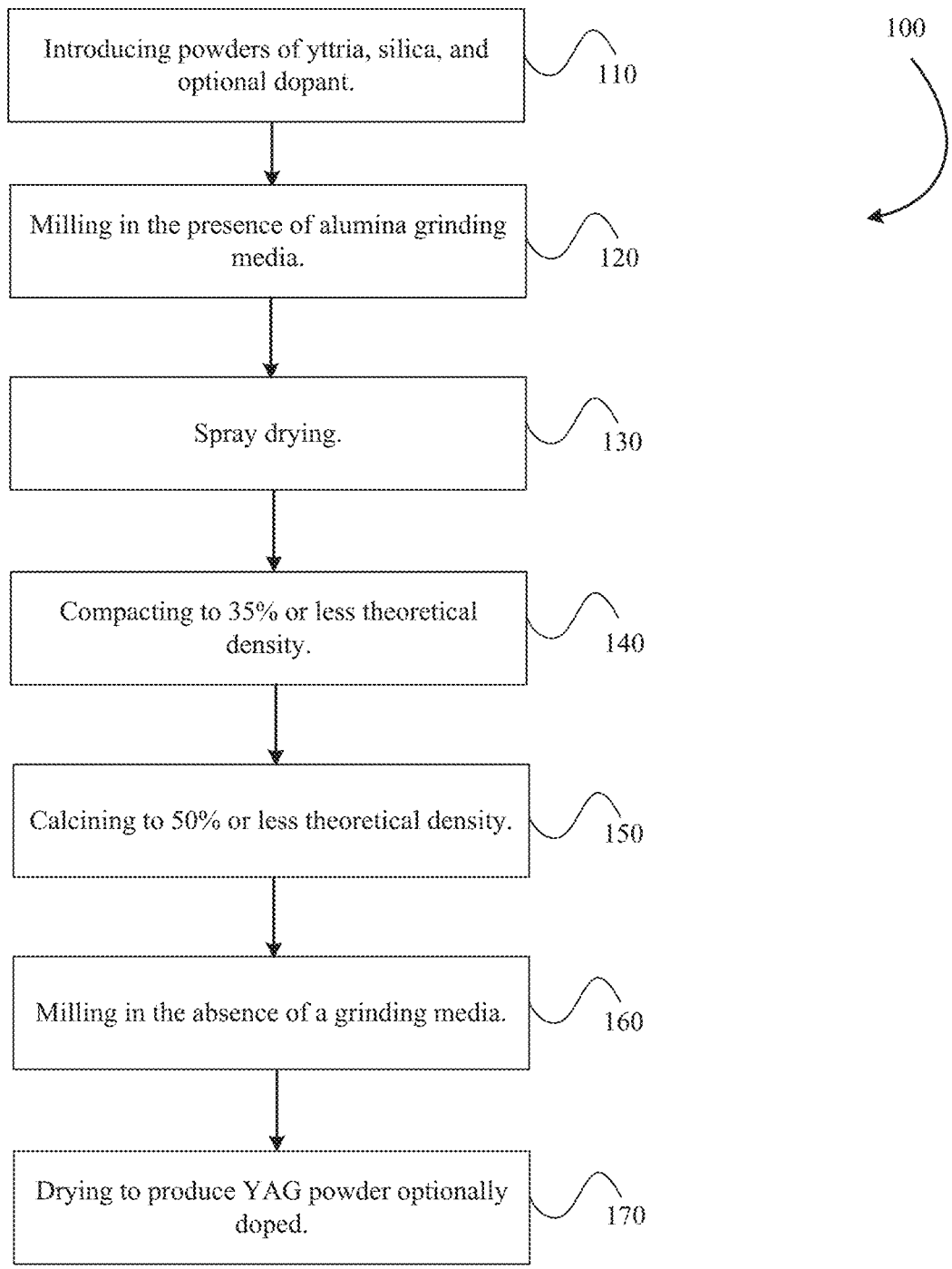
FIG. 1 is a flow chart of an exemplary process.

As discussed above, YAG powders produced using previous processes do not meet the demands for yield, cost, and sinterability. Specifically, previous solid state methods of making YAG powders require repeated calcinations for longer times and at higher temperature, therefore lacking process efficiencies, e.g., product yields are low. Also, previous solid state methods of making YAG powders require higher sintering temperatures, e.g., 1600° C. or greater, in order to achieve high density articles.

The inventors have now found that by employing an alumina grinding media in a first (ball) milling, compacting the resulting powder slurry before calcination, and using little or no grinding media in the final milling, a more simple and efficient production process is achieved.

Without being bound by theory, it is postulated that the disclosed processes promote more efficient transformation to the YAG phase during calcination and also prevent unwanted sources of impurities during each of the milling processes. It has been found that by controlling the alumina content through ball milling with alumina grinding media, a more efficient process results, e.g., one that provides for a stoichiometric or hyper-stoichiometric alumina content via milling, which enhances the transformation to the YAG phase and avoids introducing undesired impurities. Compacting the powder slurry before calcining further enhances the transformation to the YAG phase, which advantageously may be performed at lower temperatures, at shorter times, and/or with fewer calcination cycles—all of which contribute to a more efficient process, e.g., a process with improved yield.

Further, by not introducing any grinding media in the milling after calcination, the process provides higher purity and better control of component composition, which results in a more pure YAG powder, e.g., a YAG powder with fewer impurities. Without being bound by theory, it is believed that the combination of compacting prior to calcining coupled with the introduction of alumina through milling contributes to a more uniform distribution of alumina in yttria, which allows less time and/or lower temperatures to complete reactions between alumina an yttria, which in turn enhances phase transformation to YAG. Importantly, by employing the disclosed processes, dopant concentration can be advantageously controlled. As a result, the doped YAG comprises fewer unwanted impurities.

Also, the disclosed processes yield a YAG powder that performs better than conventional YAG powders. For example, the disclosed YAG powders demonstrate high sinterability, e.g., the YAG powder sinters to a higher density at relatively lower sintering temperatures than conventional solid state synthesized powders. This is due to the use of lower temperature calcining, which is provided for by employing the aforementioned milling and compacting steps. Because the YAG phase transformation is achieved at a relatively lower calcining temperature, the disclosed YAG powder beneficially has fewer hard agglomerates and a smaller average grain size. In contrast, conventional YAG powders are prepared at higher calcining temperatures, which detrimentally creates more hard agglomerates resulting in low sinterability. For example, during subsequent sintering, the disclosed YAG powder can reach 98% of theoretical density sintering at 1537° C. for 8 hours, whereas a commercially available YAG powder (Intematix G91, Fremont CA) can reach only 83% of the theoretical density sintering at 1537° C. for 8 hours. As a result, solid state processes are desired to produce quality powders having controlled dopant concentrations, have high sinterability, and are manufactured more cost effectively.

The disclosed processes provide YAG that is suitable for a wide variety of applications such as for phosphor wheels, light-emitting diodes (LEDs) including white-light-emitting diodes (WLEDs), optical lens and NIR (Near Infrared) transparent windows for a laser based car engine ignitor (e.g., as a spark plug replacement), lasers, laser gun, as well as others.

YAG Powder Synthesis Process

The disclosure relates to a processes for synthesizing a YAG powder that has the aforementioned advantages. One example of the processes is illustrated in FIG. 1. The process comprises the steps of mixing powders of yttria and silica to form a powder mixture and ball milling the powder mixture to form a powder slurry. Importantly, the ball milling is conducted in the presence of an alumina grinding media and a solvent. This is important because it allows the amount of alumina to the powder slurry to be controlled, with even a hyper-stoichiometric amount of alumina introduced if desired, while not introducing unwanted impurities from conventional grinding media, e.g., milling balls. The powder mixture, in some cases, does not comprise alumina (alumina is not added to the powder). The process further comprises the steps of spray drying the powder slurry to form a spray dried powder and compacting the spray dried powder to 35% or less theoretical density to form a green compact. This beneficially allows the green compact to transform more readily to YAG phase during calcining than loose green material. The process further comprises the steps of calcining the green compact in air to 50% or less theoretical density to form a YAG compact; and milling the YAG compact, without a grinding media, and then drying to produce the YAG powder. Milling the YAG compact without a grinding media is important because this prevents introducing unwanted impurities to the final powder composition from milling balls. Each of these steps are discussed in more detail below.

As noted above, the use of the aforementioned process, e.g., the compacting step, optionally in conjunction with the ball milling (using the aluminum grinding media) provides for the aforementioned surprising results.

Initial Powders

As noted above and as exemplified in FIG. 1, the process includes the step of mixing initial powders, e.g., powders of yttria ($Y_2O_3$) and silica ($SiO_2$), to form a powder mixture.

The initial powders used in the mixing step include yttria and silica. In some cases, the yttria powder is high purity yttria. For example, the yttria powder may have a purity greater than (and including) 2N (99%), e.g., 3N (99.9%) or 4N (99.99%). In some embodiments, the yttria powder has a purity of 3N. In some cases, the yttria powder has a purity greater than (and including) 3N.

The silica and yttria may be mixed as separate powders or the starting powder may be, for example, yttria enriched with silica. In such a case, the mixing step is not required, the silica/yttria powder may simply be provided. In preferred embodiments, the silica is fumed silica. Fumed silica, or pyrogenic silica, has a low bulk density and high surface area. Such characteristics make fumed silica highly reactive in powder synthesis, particularly during the elevated temperatures used for calcination. During calcining, the silica reacts with yttria and alumina to form a Y—Al—Si—O liquid phase. This Y—Al—Si—O liquid phase evaporates at temperature above 1350° C. By adding silica to form the liquid phase, a cleansing effect is realized by the Y—Al—Si—O liquid phase evaporation. The transient liquid phase removed by the evaporation during calcining (or sintering) can be a cleansing agent. Suitable yttria and silica powders are commercially available, e.g., yttria (via Materion Corp.) and fumed silica (via Sigma-Aldrich).

In some embodiments, the powder mixture comprises from 0.005 wt % to 2.0 wt % silica and the balance yttria. For example, the powder mixture may comprise from 0.005 wt % to 2.0 wt % silica, e.g., from 0.01 wt % to 1.5 wt % silica, from 0.01 wt % to 1.0 wt % silica, from 0.01 wt % to 0.5 wt % silica, from 0.05 wt % to 0.4 wt % silica, from 0.1 wt % to 0.4 wt % silica, from 0.1 wt % to 0.3 wt % silica, or from 0.2 wt % to 0.3 wt % silica. In terms of lower limits, the powder mixture may comprise greater than 0.005 wt % silica, e.g., greater than 0.01 wt %, greater than 0.05 wt %, greater than 0.1 wt %, or greater than 0.2 wt %. In terms of upper limits, the powder mixture may comprise less than 2.0 wt % silica, e.g., less than 1.5 wt %, less than 1.0 wt %, less than 0.5 wt %, less than 0.4 wt %, or less than 0.3 wt %. In some embodiments, silica is included in the amount from 0.1 wt % to 0.3 wt % based upon the total weight of the powder mixture. The examples herein include silica in the amount of 0.25 wt % silica based upon the total weight of the powder mixture.

In some embodiments, the powder mixture comprises from 93.0 wt % to 99.99 wt % yttria. The yttria content, being the balance in the powder mixture, is also dependent upon if an optional dopant is added as discussed below. For example, the powder mixture may comprise from 93.0 wt % to 99.99 wt % yttria, e.g., from 93.0 wt % to 99.95 wt % yttria, from 95.0 wt % to 99.9 wt % yttria, from 97.0 wt % to 99.8 wt % yttria, or from 98.0 wt % to 99.8 wt % yttria. In terms of lower limits, the powder mixture may comprise greater than 93.0 wt % yttria, e.g., greater than 95.0 wt %, greater than 97.0 wt %, greater than 98.0 wt %, greater than 99.0 wt %, greater than 99.5 wt %, or greater than 99.9 wt %. In terms of upper limits, the powder mixture may comprise less than 99.99 wt % yttria, e.g., less than 99.95 wt %, less than 99.9 wt %, less than 99.8 wt %, less than 99.5 wt %, or less than 99.0 wt %. In some embodiments, yttria is included in the amount from 99.7 wt % to 99.8 wt % based upon the total weight of the powder mixture when no dopant is added. In some embodiments, yttria is included in the amount from 96.0 wt % to 99.0 wt % based upon the total weight of the powder mixture when a dopant is added.

In some cases, the powder mixture comprises small amounts, if any, alumina ($Al_2O_3$). In some embodiments, the powder mixture is devoid or substantially devoid of alumina ($Al_2O_3$). In some cases, no alumina is added to the powder mixture. In some embodiments, the powder mixture comprises from zero (0.00 wt %) to 0.5 wt % alumina. For example, the powder mixture may comprise from 0.01 wt % to 0.5 wt % alumina, e.g., from 0.05 wt % to 0.4 wt % alumina, from 0.1 wt % to 0.3 wt % alumina, or from 0.1 wt % to 0.2 wt % alumina. In terms of upper limits, the powder mixture may comprise less than 0.5 wt % alumina, e.g., less than 0.4 wt %, less than 0.3 wt %, or less than 0.2 wt %. This is important because the alumina as an initial powder can be eliminated from the process. It has been found that, by using alumna grinding media as the sole alumina source introduced during ball milling, not only is the process simplified, the alumina is uniformly distributed in the yttria and the amount of alumina to the powder slurry can be controlled during ball milling.

Optionally, a dopant is included in the powder mixture. The dopant may be employed in the form of a compound, and the dopant (dopant compound) may be added to and/or included in the powder mixture. In some embodiments, the powder mixture comprises from 10 ppm to 6.0 wt % dopant and silica as described above and the balance yttria. For example, the powder mixture may comprise from 10 ppm to 6.0 wt % dopant, e.g., from 0.01 wt % to 6.0 wt % dopant, from 0.5 wt % to 5.0 wt % dopant, from 1.0 wt % to 4.0 wt % dopant, from 1.5 wt % to 3.5 wt % dopant, from 2.0 wt % to 3.0 wt % dopant, or from 2.3 wt % to 2.7 wt % dopant. In terms of lower limits, the powder mixture may comprise greater than 10 ppm dopant, e.g., greater than 0.01 wt %, greater than 0.5 wt %, greater than 1.0 wt %, greater than 1.5 wt %, greater than 2.0 wt %, or greater than 2.3 wt %. In terms of upper limits, the powder mixture may comprise less than 6.0 wt % dopant, e.g., less than 5.0 wt %, less than 4.0 wt %, less than 3.5 wt % less than 3.0 wt %, or less than 2.7 wt %. In preferred embodiments, the dopant is included in the amount from 2.0 wt % to 3.0 wt % based upon the total weight of the powder mixture.

In some embodiments, the dopant is cerium added in the form of ceria. For example, the powder mixture may comprise from 0.1 wt % to 5.0 wt % ceria, e.g., from 0.5 wt % to 5.0 wt % ceria, from 1.0 wt % to 4.0 wt % ceria, from 1.5 wt % to 3.5 wt % ceria, from 2.0 wt % to 3.0 wt % ceria, or from 2.3 wt % to 2.7 wt % ceria. In terms of lower limits, the powder mixture may comprise greater than 0.1 wt % ceria, e.g., greater than 0.5 wt %, greater than 1.0 wt %, greater than 1.5 wt %, greater than 2.0 wt %, or greater than 2.3 wt %. In terms of upper limits, the powder mixture may comprise less than 5.0 wt % ceria, e.g., less than 4.0 wt %, less than 3.5 wt %, less than 3.0 wt %, or less than 2.7 wt %. In preferred embodiments, ceria is included in the amount from 2.5 wt %±10% based upon the total weight of the powder mixture.

The average particle size of the initial powders is non-limiting. For example, the initial powders may range in average particle size from 0.001 μm to 50 μm, e.g., from 0.005 μm to 25 μm, from 0.01 μm to 10 μm, or from 0.01 μm to 5 μm. In terms of lower limits, the average particle size of the initial powders may be greater than 0.001 μm, e.g., greater than 0.005 μm, or greater 0.01 μm. In terms of upper limits, the average particle size of the initial powders may be less than 50 μm, e.g., less than 25 μm, less than 10 μm, or less than 5 μm. The initial powder average particle size is not a dominant factor in predicting, for example, the density of green compacts to be formed and/or the completeness of phase transformation to YAG upon calcining. More important to providing complete YAG phase transformation in the process herein is the compacting prior to calcining, which is described in detail below.

First Milling

As noted above, the process comprises the step of ball milling the powder mixture in the presence of an alumina grinding media and a solvent to form a powder slurry. "Ball milling" used herein represents the first milling step of the process, in which alumina is used as the grinding media. The use of the alumina in this manner is different from the use of conventional milling balls, which may not comprise alumina. This step is important because alumina content can be controlled, and this results in providing either a stoichiometric YAG or a hyper-stoichiometric alumina content as desired, which may enhance phase transformation to YAG.

The ball milling of the powder mixture may be performed in the presence of an alumina grinding media (and a solvent) to form a powder slurry. The inventors have found that, during ball milling, alumina from the grinding media is eroded to advantageously provide a source of alumina to the powder slurry. Beneficially, additional alumina need not be added or present.

The alumina grinding media is important because the amount of alumina eroded from the alumina grinding media can beneficially be controlled. As a result, the composition of the resultant YAG can also be controlled. This contributes to process efficiencies and to the aforementioned improvements in production yield and/or fewer calcination cycles. Conventional YAG synthesis processes do not employ an alumina grinding media to erode alumina purposely and/or to deviate from stoichiometric YAG, and as such, are incapable of achieving these benefits.

Factors determining the amount of alumina provided to the powder slurry during ball milling include milling energy, milling speed revolutions per minute (RPM), diameter of the ball milling vessel, powder mixture loading in powder slurry, volume of the powder slurry, volume and/or weight of alumina grinding media, and wear characteristics of the alumina grinding media. Factors can be interrelated, for example, the larger the diameter of vessel, the slower the rotation. The peripheral speed of the mill is controlled to prevent acting like a centrifuge where the balls do not cascade within the vessel but stay on the perimeter of the mill.

The nominal stoichiometric ratio of $Y_2O_3$ (yttria) to $Al_2O_3$ (alumina) by mole, is 3:5 or $3Y_2O_3:5Al_2O_3$. In some cases, after ball milling, a hyper-stoichiometric amount of alumina is present in the powder slurry. In other words, the ratio of yttria to alumina is greater than (or equal to) 3:5 (0.6:1), e.g., 3 to 5.1 (0.59:1), 3 to 5.2 (0.58:1), 3 to 5.3 (0.57:1), 3 to 5.35 (0.56:1) 3 to 5.4 (0.555:1), 3 to 5.5 (0.55:1), 3 to 5.6 (0.54:1), 3 to 5.7 (0.53:1), or greater. In some embodiments, the composition of the powder mixture after ball milling has a ratio of $Y_2O_3:Al_2O_3$ of from 3:5 (0.6:1) to 3:5.5 (0.55:1).

After ball milling, the composition comprises a stoichiometric $3Y_2O_3:5Al_2O_3$ and less than 3 wt % additional $Al_2O_3$ based upon the total weight of powder constituents. For example, the amount of additional $Al_2O_3$ may be from zero (0.00) wt % to 3.0 wt % additional $Al_2O_3$, e.g., from 0.1 wt % to 3.0 wt % additional $Al_2O_3$, from 0.5 wt % to 2.5 wt % additional $Al_2O_3$, or from 1.0 wt % to 2.0 wt % additional $Al_2O_3$. In terms of lower limits, the amount of additional $Al_2O_3$ may be greater than zero (0.00) wt % additional $Al_2O_3$, e.g., greater than 0.1 wt % additional $Al_2O_3$, greater than 0.5 wt % additional $Al_2O_3$, or greater than 1.0 wt % additional $Al_2O_3$. In terms of upper limits, the amount of additional $Al_2O_3$ may be less than 3.0 wt % additional $Al_2O_3$, e.g., less than 2.5 wt % additional $Al_2O_3$, or less than 2.0 wt % additional $Al_2O_3$. The additional $Al_2O_3$ includes an eroded portion of the alumina grinding media. The eroded portion is due to wear of the alumina grinding media during ball milling.

The alumina grinding media is of high purity. In some embodiments, the alumina grinding media has a purity of from 95.0% to 99.99% $Al_2O_3$. For example, the alumina grinding media has a purity from 95.0% to 99.9% $Al_2O_3$, e.g., from 95.0% to 99.8% $Al_2O_3$, from 97.0% to 99.8% $Al_2O_3$, from 98.0% to 99.8% $Al_2O_3$, from 99.0% to 99.8% $Al_2O_3$, or from 99.5% to 99.8% $Al_2O_3$. In terms of lower limits, the alumina grinding media has a purity greater than 95.0% $Al_2O_3$, e.g., greater than 95.0% $Al_2O_3$, greater than 96.0% $Al_2O_3$, greater than 97.0% $Al_2O_3$, greater than 98.0% $Al_2O_3$, greater than 99.0% $Al_2O_3$, greater than 99.5% $Al_2O_3$, greater than 99.8% $Al_2O_3$, or greater than 99.9% $Al_2O_3$. In terms of upper limits, the alumina grinding media has a purity less than 100% $Al_2O_3$, e.g., less than 99.99% $Al_2O_3$, less than 99.9% $Al_2O_3$, or less than 99.8% $Al_2O_3$. In preferred embodiments, the alumina grinding media has a purity from 95.0% to 99.8% $Al_2O_3$. The high purity alumina grinding media is $\alpha$-$Al_2O_3$. The alumina grinding media have a diameter ranging from 3 mm to 25 mm. The alumina grinding media is wear resistant with a Vickers hardness of 14 GPa (±10%) and a density of from 3.88 g/cm$^3$ to 3.97 g/cm$^3$. The wear of the alumina grinding media imparts $Al_2O_3$ particles to the powder mixture having an average particle size distribution of in the micron range, e.g., 1-10 μm. In aspects, the $Al_2O_3$ particles are 1-5 μm or 1-3 μm. This is important because the transformation to YAG phase during calcining can be enhanced by controlling the amount of alumina present as well as controlling the size of the alumina particles.

In some cases, the ball milling is performed in a polymer lined ball milling vessel. The diameter of the vessel may range from 15 cm to 60 cm in diameter and from 15 cm to 60 cm in height. The ball milling may be performed in a non-reactive vessel, such as a polyurethane lined milling jar, e.g., an Abbethane jar with lifters unit by Paul O'Abbe (Bensenville, IL), with dimensions of (30 cm diameter×30 cm height). The contents of the polymer lined ball milling vessel include the powder slurry comprising the powder mixture, a solvent, and the alumina grinding media. The solvent may be distilled water or deionized water. The amount of solvent ranges from 50 to 80 wt % based upon the total weight of the powder mixture.

The ball milling may be conducted at a speed ranging from 15 RPM to 70 RPM. For example, the ball milling speed may be from 15 RPM to 70 RPM, e.g., 30 RPM to 70 RPM, or from 50 RPM to 70 RPM. Ball milling may be performed for a time from 1 hour to 64 hours. For example, the ball milling time may be from 1 hour to 64 hours, e.g., 4 hours to 48 hours, 8 hours to 24 hours, or from 12 hours to 20 hours. In some embodiments, ball milling is performed at 60 RPM for 16 hours. The amount of alumina imparted to the powder slurry may be calculated by measuring the difference in weight of the alumina grinding media after ball milling relative to the initial weight of the alumina grinding media. The grinding media may be cylindrical or spherical or other shape with dimensions of about 13 mm in diameter and/or height. For example, the grinding media may be from 10 mm to 20 mm in diameter and from 10 mm to 20 mm in height, e.g., from 12 mm to 18 mm in diameter and from 12 mm to 18 mm in height, or from 13 mm to 16 mm in diameter and from 13 mm to 16 mm in height. The wear (erosion by weight) of the alumina grinding media may be from 5 wt % to 10 wt %, e.g., 6 wt % to 8 wt %, or from 6.5 wt % to 7 wt %.

An organic binder may be added to the powder slurry prior to spray drying the powder slurry. The organic binder is preferably water soluble. Suitable organic binders include acrylic polymer based ammonium solution (B-60A, commercially available from Rohm and Haas), or polyvinyl alcohol solution, or the like.

The organic binder added prior to spray drying may be present in an amount ranging from 3 wt % to 9 wt % organic binder based upon the total weight of the powder slurry, e.g., from 4 wt % to 8 wt % organic binder, from 5 wt % to 7 wt % organic binder, or from 5.5 wt % to 6.5 wt % organic binder. In terms of lower limits, the amount of organic binder added may be greater than 3 wt % organic binder, e.g., greater than 4 wt % organic binder, greater than 5 wt % organic binder, or greater than 5.5 wt % organic binder. In terms of upper limits, the amount of organic binder added may be less than 9 wt % organic binder, e.g., less than 8 wt % organic binder, less than 7 wt % organic binder, or less than 6.5 wt % organic binder. In preferred embodiments, the amount of organic binder added is 6 wt %±10% based upon the total weight of the powder mixture. The organic binder subsequently burns off during later processing, e.g., at 500° C. or above, such as during calcining.

Spray Drying

The processes may further comprise the step of spray drying the powder slurry to form a spray dried powder. This step is important because the spray drying forms discreet granules having a uniform distribution of yttria, silica, alumina, and optional dopant. Spray drying may be performed using a Yamato DL4120 (Santa Clara, CA) unit. The inlet temperature may range from 200° C. to 400° C., e.g., from 200° C. to 350° C., from 200° C. to 300° C., from 200° C. to 280° C., from 210° C. to 270° C., from 220° C. to 260° C., or from 230° C. to 250° C. In terms of lower limits, the inlet temperature may be greater than 200° C., e.g., greater than 210° C., greater than 220° C., or greater than 230° C. In terms of upper limits, the inlet temperature may be less than 400° C., e.g., less than 350° C., less than 300° C., less than 280° C., less than 270° C., less than 260° C., or less than 250° C. In preferred embodiments, the inlet temperature is 240° C.±10%. The outlet temperature may range from 70° C. to 110° C., e.g., from 75° C. to 105° C., from 80° C. to 100° C., or from 85° C. to 95° C. In terms of lower limits, the outlet temperature may be greater than 70° C., e.g., greater than 75° C. greater than 80° C., or greater than 85° C. In terms of upper limits, the outlet temperature may be less than 110° C., e.g., less than 105° C., less than 100° C., or less than 95° C. In preferred embodiments, the outlet temperature is from 85° C. to 95° C. Spray drying is performed under compressed air. The pressure for spray drying may range from 0.01 MPa to 0.6 MPa of compressed air, e.g., from 0.02 MPa to 0.5 MPa, from 0.05 MPa to 0.4 MPa, or from 0.1 MPa to 0.3 MPa. In terms of lower limits, the pressure may be greater than 0.01 MPa, e.g., greater than 0.02 MPa, greater than 0.05 MPa, or greater than 0.01 MPa. In terms of upper limits, the pressure may be less than 0.6 MPa, e.g., less than 0.5 MPa, less than 0.4 MPa, or less than 0.3 MPa. In preferred embodiments, the pressure is from 0.1 to 0.3 MPa of compressed air.

The spray dried powder includes an average granule size distribution ranging from 0.1 μm to 425 μm. The average granule size distribution may range from 0.1 μm to 425 μm, e.g., from 0.1 μm to 300 μm, from 0.1 μm to 200 μm, from 0.1 μm to 100 μm, from 0.1 μm to 75 μm, or from 0.1 μm to 50 μm. In terms of lower limits, the average granule size distribution may be greater than 0.1 μm, e.g., greater than 0.2 μm, greater than 0.3 μm, greater than 0.4 μm, or greater than 0.5 μm. In terms of upper limits, the average granule size distribution may be less than 425 μm, e.g., less than 300 μm, less than 200 μm, less than 100 μm, less than 75 μm, or less than 50 μm. In embodiments, the spray dried powder may be passed through a sieve (US mesh size No. 40, 425 μm) so that any and all granules 425 μm may be used for compacting.

Compacting

The processes further include the step of compacting the spray dried powder to form a green compact. The spray dried powder is compacted, which provides several process advantages over conventional powder solid state calcination processes that do not compact in this way. Firstly, the powder composition will convert to YAG phase more readily during subsequent calcining, because the green compact has a higher green density relative to that of the loosely packed powder for the calcination, and thus the diffusion distance of ions necessary to form the YAG phase is shorter. Therefore the formation of YAG will proceed at a lower calcination temperature and/or at a lesser time than would be required for loosely packed powders during calcining. Moreover, in some embodiments, the transformation to YAG is complete in a single calcination cycle. Secondly, by using transient sintering aids, as with the silica introduced into the initial powder mixture, a Y—Al—Si—O liquid phase forms during calcination. This also results in the formation of YAG to proceed more readily and at lower calcination temperatures (and/or for a lesser time or fewer calcination cycles) due to the enhanced mass transformation through the liquid Y-A-Si—O sintering aids. Therefore, compacting according to the process described herein is critical to the formation of YAG while requiring fewer, if any, calcination cycle repetitions.

Compacting the spray dried powder is performed to reduce the distance between the powder particles to enhance YAG formation during subsequent calcining. Compacting the spray dried powder to form a green compact may include compacting to 35% or less theoretical density. For example, compacting the spray dried powder to form a green compact may include compacting to from 20% theoretical density to 40% theoretical density, e.g., from 25% theoretical density to 40% theoretical density, from 30% theoretical density to 40% theoretical density, or from 35% theoretical density to 40% theoretical density. Compacting the spray dried powder to form a green compact may include compacting to 20% or less theoretical density, 25% or less theoretical density, 30% or less theoretical density, 35% or less theoretical density, or 40% or less theoretical density. In preferred embodiments, the amount of compacting is to 35% theoretical density ±10% or less. The density of the material compacted to the target of 35% theoretical density is 1.593 g/cm$^3$±10%.

Compacting the spray dried powder may include uni-axial pressing or cold isostatic pressing. Compacting may be performed using a Hydramet unit. The pressure for compacting may range from 200 psi to 2000 psi, e.g., from 300 psi to 1800 psi, from 400 psi to 1600 psi, from 500 psi to 1500 psi, or from 1000 psi to 1500 psi. In terms of lower limits, the pressure may be greater than 200 psi, e.g., greater than 300 psi, greater than 400 psi, greater than 500 psi, or greater than 1000 psi. In terms of upper limits, the pressure may be less than 2000 psi, e.g. less than 1800 psi, less than 1600 psi, or less than 1500 psi. In preferred embodiments, the pressure is from 500 psi to 1500 psi, e.g., from 1000 psi to 1500 psi.

In some embodiments, the compacting includes forming the spray dried powder (or granules) into grinding media shapes (0.75 inch diameter×0.75 inch height) using a uni-axial press, e.g., a Hydramet uniaxial press. While elevated temperatures are contemplated, compacting the spray dried powder may be performed advantageously at room temperature in air. Compacting may include cold compacting. The following are non-limiting example pressures that may be suitable in compacting the spray dried powder according to some embodiments herein: compacting the spray dried powder may performed at a pressure from 500 psi to 1500 psi, e.g., from 500 psi to 1250 psi, or from 750 psi to 1000 psi.

Calcining

The process further comprises the step of calcining the green compact in air to 50% or less theoretical density to form a YAG compact. In other words, calcining provides for the transformation from green compact to $Y_3Al_5O_{12}$, which optionally further includes dopant as described above. Calcining achieves the desired phase while maintaining discreet particles as powder. In some embodiments, at least 95% of the $3Y_2O_3:5Al_2O_3$ is transformed to $Y_3Al_5O_{12}$, or at least 97%, or at least 98%, or at least 99%. In some embodiments, 100% of the $3Y_2O_3:5Al_2O_3$ is transformed to $Y_3Al_5O_{12}$. Calcining further densities the compact relative to the green compact to a higher percentage of theoretical density, yet the YAG compact remains unsintered. In other words, the powder is not formed to a dense solid.

For example, calcining the green compact to form a YAG compact may include compacting to 50% or less theoretical density. For example, calcining the green compact to form a YAG compact may include calcining to from 40% theoretical density to 60% theoretical density, e.g., from 45% theoretical density to 60% theoretical density, or from 45% theoretical density to 55% theoretical density. Calcining the green compact to form a YAG compact may include calcining to 40% or less theoretical density, 45% or less theoretical density, 50% or less theoretical density, 55% or less theoretical density, or 60% or less theoretical density. In preferred embodiments, the YAG compact is calcined to 50% theoretical density ±10% or less. The density of the YAG compact calcined to the target of 50% theoretical density is 2.275 g/cm$^3$±10%.

Calcining may be performed in any suitable furnace, e.g., an Armil furnace at a temperature ranging from 1100° C. to 1650° C. for a time ranging from 2 to 64 hours. Calcining may be performed in air.

The temperature at which calcining is performed ranges from 1100° C. to 1650° C. For example, calcining is performed from 1200° C. to 1650° C., e.g. from 1350° C. to 1600° C., or from 1450° C. to 1550° C. In terms of lower limits, the calcining may be performed at a temperature greater than 1100° C., e.g., greater than 1200° C., greater than 1350° C., or greater than 1450° C. In terms of upper limits, the calcining may be performed at a temperature less than 1650° C., e.g., less than 1660° C., or less than 1550° C. In preferred embodiments, the calcining is performed at a temperature of from 1450° C. to 1550° C. Importantly, the calcining, in some embodiments, is conducted at temperatures below what it conventionally considered sintering temperatures, which, in some cases, avoids sintering as is noted above. The disclosed process steps make it possible for the lower temperature calcining—without these process steps, the calcining step would require higher temperatures and would encounter the troubles and detriments associated therewith.

Calcining may be performed at temperatures described above for a time that ranges from 2 hours to 64 hours. For example, calcining is performed for 2 hours to 64 hours, e.g. from 4 hours to 48 hours, from 6 hours to 24 hours, or from 8 to 16 hours, or from 10 to 14 hours. In terms of lower limits, the calcining may be performed for a time greater than 2 hours, e.g., greater than 4 hours, greater than 6 hours, greater than 8 hours, or greater than 10 hours. In terms of upper limits, the calcining may be performed for a time less than 64 hours, e.g., less than 48 hours, less than 24 hours, less than 16 hours, or less than 14 hours. In preferred embodiments, the calcining is performed for a time of from 8 to 16 hours.

Calcining may be performed using a heat treatment schedule including one or more holds in a single calcining cycle. Advantageously, two (or more) temperature tiered calcining provides a more complete transformation to the desirable YAG phase. Each hold is associated with a temperature and a time at that temperature. In some embodiments, the calcining includes a heat treatment schedule that has one hold, two holds, three holds, four holds, or more. For example, calcining may include a first hold having a first temperature for a first time, a second hold having a second temperature for a second time, optionally a third hold having a third temperature for a third time, and optionally a fourth hold having a fourth temperature for a fourth time.

Calcining thus may include at least two hold temperatures. The at least two hold temperatures at which calcining is performed may range from 1100° C. to 1650° C. For example, the at least two hold temperatures range from 1200° C. to 1650° C., e.g. from 1350° C. to 1600° C., or from 1450° C. to 1550° C. In terms of lower limits, the at least two hold temperatures may be greater than 1100° C., e.g., greater than 1200° C., greater than 1350° C., or greater than 1450° C. In terms of upper limits, the at least two hold temperatures may be less than 1650° C., e.g., less than 1660° C., or less than 1550° C. In preferred embodiments, the at least two hold temperatures are from 1450° C. to 1550° C. The at least two hold temperatures may be the same or different.

Calcining including at least two hold temperatures may be performed at temperatures described above with each hold for a time that ranges from 2 hours to 64 hours. For example, the at least two hold times may range from 2 hours to 64 hours, e.g. from 4 hours to 48 hours, from 6 hours to 24 hours, or from 8 to 16 hours, or from 10 to 14 hours. In terms of lower limits, the at least two hold times may be for a time greater than 2 hours, e.g., greater than 4 hours, greater than 6 hours, greater than 8 hours, or greater than 10 hours. In terms of upper limits, the at least two hold times may range may be for a time less than 64 hours, e.g., less than 48 hours, less than 24 hours, less than 16 hours, or less than 14 hours. In preferred embodiments, the at least two hold times are for a time of from 8 to 16 hours. The at least two hold times may be the same or different.

In preferred embodiments, the calcining includes a first hold having a first temperature for a first time and a second hold having a second temperature for a second time, e.g., the calcining includes a first hold at a first temperature from 1450° C. to 1550° C. for a first time from 8 to 16 hours and a first hold at a first temperature from 1450° C. to 1550° C. for a first time from 8 to 16 hours. In one example, calcining is performed at a first temperature of 1525° C. for a time of 8 hours and then a second temperature of 1550° C. for a time of 8 h in a single cycle. In a single cycle means consecutively and without cooling between holds.

Calcining, importantly, affects the transformation of the previously green compact to the yttrium aluminum garnet (YAG) compact, wherein the phase content may be determined by suitable techniques such as x-ray diffraction. YAG is referred to herein as $Y_3Al_5O_{12}$ having a crystal structure in the cubic crystal category. The phase content of the YAG compact includes at least 90 wt % $Y_3Al_5O_{12}$, e.g., at least 91 wt % $Y_3Al_5O_{12}$, at least 92 wt % $Y_3Al_5O_{12}$, at least 93 wt % $Y_3Al_5O_{12}$, at least 94 wt % $Y_3Al_5O_{12}$, at least 95 wt % $Y_3Al_5O_{12}$, at least 96 wt % $Y_3Al_5O_{12}$, at least 97 wt % $Y_3Al_5O_{12}$, at least 98 wt % $Y_3Al_5O_{12}$, or at least 99 wt % $Y_3Al_5O_{12}$.

After calcining, the phase content may advantageously include low amounts of minor phases. Minor phases may include silica, alumina, ceria (or other dopant), or phases YAM or YAP indicative of non-complete phase transformation to YAG. The phase content of the YAG compact includes at most 10 wt % minor phase(s), e.g., at most 9 wt % minor phase(s), at most 8 wt % minor phase(s), at most 7 wt % minor phase(s), at most 6 wt % minor phase(s), at most 5 wt % minor phase(s), at most 4 wt % minor phase(s), at most 3 wt % minor phase(s), at most 2 wt % minor phase(s), at most 1 wt % minor phase(s). In some embodiments, zero or substantially zero minor phases are present and/or detectable.

Prior to calcining or included in the calcining heat treatment schedule may be an additional hold for binder burnout. This hold is typically at a lower temperature than the hold temperatures for calcining, which effect the phase transformation to YAG. The binder burnout can be performed as part of the ramping up heat to the calcining temperatures as detailed above. The temperature at which binder burnout is performed ranges from 400° C. to 600° C. For example, binder burnout is performed from 400° C. to 600° C., e.g. from 425° C. to 575° C., or from 450° C. to 550° C., or from 475° C. to 525° C. In terms of lower limits, the binder burnout may be performed at a temperature greater than 400° C., e.g., greater than 425° C., greater than 450° C., or greater than 475° C. In terms of upper limits, the binder burnout may be performed at a temperature less than 600° C., e.g., less than 575° C., less than 550° C., or less than 525° C. In preferred embodiments, the binder burnout is performed at a temperature of about 500° C.±10%.

Optionally calcining may be repeated. In preferred embodiments, only a single calcining is performed to provide the transformation to YAG. In some embodiments calcining is repeated once, and in other embodiments twice. Process may include one, two, or three calcinations total. In some embodiments, calcining is repeated a maximum of one time. Process is devoid of calcining more than three times. In embodiments where calcining is repeated, silica is added prior to each subsequent calcination. For repeated calcining, the repeated cycles may include any or all of the steps of adding silica, ball milling, spray drying, and compacting in each repeated cycle.

Second Milling (After Calcining)

The process may further comprise the step of milling the YAG compact followed by drying the milled compact to produce the YAG powder. The inventors have discovered that milling may be performed in the absence of any added grinding media or grinding balls. Grinding media, beneficially, are not required and are not added because the YAG compact material itself acts as the grinding media, in other words, the milling is autogenous. In some embodiments, the YAG compact includes a plurality of compacts as formed into grinding media shapes (0.75 inch diameter×0.75 inch height) using a uniaxial press as in the cold compacting step described above. This step using the YAG compact to autogenously mill is important, because this ensures that no impurities are introduced during the milling. Therefore, a common source of additional contamination with impurities, such as from grinding media, is advantageously eliminated.

Milling may be performed in a polymer lined milling vessel. In some cases, as for vessel used in ball milling as previously described, the diameter of the vessel may range from 15 cm to 60 cm in diameter and from 15 cm to 60 cm in height. The milling may be performed in a non-reactive vessel, such as a polyurethane lined milling jar, e.g., an Abbethane jar with lifters unit by Paul O'Abbe (Bensenville, IL), with dimensions of (30 cm diameter×30 cm height). The contents of the polymer lined milling vessel include the YAG compact and a solvent. The vessel is devoid or substantially devoid of an added grinding media. Milling the YAG compact includes autogenous crushing of YAG compact material upon itself to produce the YAG powder. The solvent may be ethanol alcohol or isopropyl alcohol. The amount of solvent ranges from 50 to 80 wt % based upon the total weight of the YAG solid constituents.

Milling of the YAG may be conducted at a speed ranging from 15 RPM to 70 RPM. For example, the milling speed may be from 15 RPM to 70 RPM, e.g., 30 RPM to 70 RPM, or from 50 RPM to 70 RPM. Milling may be performed for a time from 1 hour to 64 hours. For example, the milling time may be from 1 hour to 64 hours, e.g., 4 hours to 48 hours, 8 hours to 24 hours, or from 12 hours to 20 hours. In some embodiments, milling is performed at 60 RPM for 16 hours. In preferred embodiments, milling of the YAG compact is performed for a time of at least 6 hours.

Milling the YAG compact produces a powder having an average particle size distribution of less than 100 μm. In some embodiments, the average particle size distribution is less than 63 μm. This corresponds to the powder passing through a 230 mesh sieve. In other embodiments, the average particle size distribution is less than 44 μm. This corresponds to the powder passing through a 325 mesh sieve. The milled YAG compact material is sieved before drying to remove any agglomerates. In some embodiments, the YAG powder has a bimodal particle size distribution. The milled YAG compact then undergoes drying to produce the YAG powder.

Drying

Drying may be performed in a suitable dryer, e.g., a Fisher Scientific Lab drying oven at a temperature of 90° C. or less. In some embodiments, drying is performed at a temperature less than 90° C. Drying may be performed for a time of from 2 hours to 24 hours.

The resultant YAG powder is of composition $Y_3Al_5O_{12}$, and in some embodiments has a dopant concentration of 0.1 wt % to 3.0 wt %. The concentration of dopant initially introduced is maintained to about ±10% during the process. In some embodiments, the concentration of dopant is unchanged throughout the steps of the process. In aspects, the YAG powder may have, as determined by x-ray diffraction (XRD) analysis, up to 3 vol % of an oxide at the YAG grain boundaries. Oxides may include alumina or ceria, for example. In some embodiments, less than 1 vol % of oxides are present at the YAG grain boundaries. While oxides present at the grain boundaries may make YAG powder unsuitable for certain applications requiring transparency, such powders may be useful for applications requiring translucency or where some oxide presence at the grain boundaries can be tolerated and even advantageous. For example, excess alumina at the YAG grain boundaries can result in increasing the thermal characteristics of the final product, such as increasing the thermal diffusivity. With a hyper-stoichiometric amount of alumina, e.g., 2.1 wt % of $Al_2O_3$, the thermal diffusivity of the YAG is improved a significant 4% from 3.00 mm²/s to 3.11 mm²/s.

The resultant YAG powder according to the processes herein may then be made into a final product, which may include sintering to achieve a dense product. Sintering by methods known in the art include solid state sintering, hot pressing, hot isostatic pressing, and others. For sintering the YAG, temperatures from 1500° C. to 1800° C. are required.

The temperature at which sintering is performed is typically higher than the calcining temperatures of the processes herein. For example, sintering is performed from 1500° C. to 1800° C., e.g. from 1525° C. to 1775° C., or from 1550° C. to 1750° C. In terms of lower limits, the sintering may be performed at a temperature greater than 1500° C., e.g., greater than 1525° C., greater than 1550° C., or greater than 1575° C. In terms of upper limits, the sintering may be performed at a temperature less than 1800° C., e.g., less than 1775° C., or less than 1750° C.

Sintering may be performed at temperatures described above for a time that ranges from 2 hours to 64 hours. For example, sintering is performed for 2 hours to 64 hours, e.g. from 4 hours to 48 hours, from 6 hours to 24 hours, or from 8 to 16 hours, or from 10 to 14 hours. In terms of lower limits, the sintering may be performed for a time greater than 2 hours, e.g., greater than 4 hours, greater than 6 hours, greater than 8 hours, or greater than 10 hours. In terms of upper limits, the sintering may be performed for a time less than 64 hours, e.g., less than 48 hours, less than 24 hours, less than 16 hours, or less than 14 hours. In preferred embodiments, the sintering is performed for a time of from 8 to 16 hours.

YAG Structure and Composition

The present disclosure relates to yttrium aluminum garnet (YAG) powder synthesis. YAG has a standard formula $Y_3Al_5O_{12}$ that corresponds to the stoichiometric 3:5 ratio of $Y_2O_3$ (yttria) to $Al_2O_3$ (alumina), or $3Y_2O_3:5Al_2O_3$, or the ratio may be written as $0.6:1$ $Y_2O_3$ to $Al_2O_3$. YAG crystal structure is a complex cubic structure containing three different oxygen polyhedral, with $Y^{+3}$ ions occupying dodecahedral sites and $Al^{3+}$ ions in octahedral and tetrahedral sites in the ratio of 2:3. This arrangement is due to the differences in the ionic radii: $O^{-2}$ (1.4 Å), $Y^{+3}$ (1.281 Å), $Al^{3+}$ (0.51 Å). Unit cell parameters can be altered from cubic symmetry by substituting with cations of different ionic radii. Cations having similar ionic radii can replace $Y^{+3}$ as, for example, with doping YAG by making a cation substitutions with $Ce^{+3}$. YAG doped with cerium, or Ce:YAG, is useful as a phosphor in cathode ray tubes, white light-emitting diodes, and as a scintillator. Other dopants are also contemplated. A phosphor, for example, can be transition metal or lanthanide activated.

Advantageously in addition to being readily tailorable to desired dopants, the YAG powder formed according to the processes herein can be readily sintered to a dense final article. For example, upon subsequent sintering, the disclosed YAG powder forms an article that can reach 98% of theoretical density sintering at 1537° C. for 8 hours, whereas a commercially available YAG powder (Intematix G91, Fremont Calif.) can reach only 83% of the theoretical density sintering at 1537° C. for 8 hours. In some embodiments, the sintered YAG article can be from 90% theoretical density to 100% theoretical density, e.g., from 92% theoretical density to 100% theoretical density, or from 94% theoretical density to 99% theoretical density. Sintering to form a YAG article may include sintering to 90% or greater theoretical density, 92% or greater theoretical density, 94% or greater theoretical density, 96% or greater theoretical density, or 97% or greater theoretical density. In preferred embodiments, the YAG compact is sintered to 98% theoretical density ±10% or less.

Doped YAG

YAG powder synthesis as disclosed herein may further include employing a dopant comprising a lanthanide or transitional metal prior to transforming the initial yttria and silica into YAG. Suitable dopants include lanthanide or transitional metals ionized to +3. Suitable dopants may include those having an ionic radius equal to or less than 0.114 nm. The dopant is introduced to the process with the initial yttria, silica, and/or silica enriched yttria powders. The dopant may be enriched in the yttria powder or introduced as a separate powder to be mixed prior to making a powder slurry.

Lanthanides include chemical elements with atomic numbers 57 through 71, and are characterized as having one valence electron in the 5d shell. Suitable lanthanides include lanthanum, cerium, praseodymium, neodymium, promethium, samarium, europium, gadolinium, terbium, dysprosium, holmium, erbium, thulium, ytterbium, and lutetium. Generally, a transition metal is an element whose atom has a partially filled d sub-shell, or which can give rise to cations with an incomplete d sub-shell. For purposes herein, scandium and zinc are considered transition metals. Suitable transition metals include scandium, titanium, vanadium, chromium, manganese, iron, cobalt, nickel, copper, zinc, zirconium, niobium, molybdenum, technetium, ruthenium, rhodium, palladium, silver, cadmium. The lanthanide or transitional metal as dopant herein may comprise scandium, titanium, vanadium, chromium, manganese, iron, cobalt, nickel, copper, zinc, zirconium, niobium, molybdenum, technetium, ruthenium, rhodium, palladium, silver, cadmium, lanthanum, cerium, praseodymium, neodymium, promethium, samarium, europium, gadolinium, terbium, dysprosium, holmium, erbium, thulium, ytterbium, lutetium, or combinations thereof. In some embodiments, the dopant is scandium, zinc, or cerium.

The dopant introduced during YAG powder synthesis as disclosed herein may be in the form of a compound. The compound may be an oxide, a hydrate, a nitrate, a chloride, or combinations thereof. Example compounds to introduce cerium as dopant include, but are not limited to, ceria ($CeO_2$), cerium (III) chloride heptahydrate ($CeCl_3 \cdot 7H_2O$), cerium (III) nitrate hexahydrate ($Ce(NO_3)_3 \cdot 6H_2O$), or combinations thereof. Example compounds to introduce scandium as dopant include, but are not limited to, scandium oxide ($Sc_2O_3$) and scandium chloride hexahydrate ($ScCl_3 \cdot 6H_2O$). Example compounds to introduce zinc as dopant include, but are not limited to, zinc oxide (ZnO) and zinc chloride ($ZnCl_2$).

A more complete understanding of the components, processes and apparatuses disclosed herein can be obtained by reference to the accompanying drawings. These figures are merely schematic representations based on convenience and the ease of demonstrating the present disclosure, and are, therefore, not intended to indicate relative size and dimensions of the devices or components thereof and/or to define or limit the scope of the exemplary embodiments.

FIG. 1 illustrates flow chart for the process 100 according to exemplary embodiments. Step 110 is the introduction of initial powders. The initial powders may include yttria, silica, and an optional dopant (or dopant compound). The powders may be introduced (e.g., yttria enriched with silica) or be introduced as separate powders (e.g., yttria and fumed silica) that are mixed to form a powder mixture. The powder mixture may be devoid of alumina, e.g., no alumina is included in the powder mixture. Step 120 includes milling the powder mixture. Ball milling in step 120 includes rolling a vessel including the powder mixture of step 110 along with a solvent and alumina grinding media. Due to wear of the alumina grinding media during milling 120 that is controlled via various parameters as discussed above alumina is introduced to the powder slurry. After the desired amount of alumina is incorporated into the powder slurry, an optional organic binder is added, and step 130 of spray drying the powder slurry is performed to generate discrete, uniformly distributed particles of alumina, yttria, silica, and optional dopant. Process 100 further includes the step of compacting 140. Compacting is performed to achieve 35% or less theoretical density. This step is critical for shortening distances between ions in the green compact. Therefore, during the next step of calcining 150, transformation to YAG phase from the alumina, yttria, and silica phases (and optional dopant) of the green compact is more readily achieved and a YAG compact is formed. More readily achieved phase transformation may equate to at least one of the following as compared to calcining a loose material, calcining may be performed: at a lower temperature, for a lower time, and/or in few cycles. Process 100 includes milling 160 the YAG compact in the absence of grinding media, using the YAG material to fall upon and crush itself to form a milled YAG, which then undergoes drying 170 and optional sieving to produce a YAG powder.

In some embodiments, any or some of the steps or components disclosed herein may be considered optional. In some cases, any or some of the aforementioned items in this description may be expressly excluded, e.g., via claim language. For example claim language may be modified to recite that the powder mixture does not comprise or excludes a particular oxide or dopant.

As used herein, "greater than" and "less than" limits may also include the number associated therewith. Stated another way, "greater than" and "less than" may be interpreted as "greater than or equal to" and "less than or equal to." It is contemplated that this language may be subsequently modified in the claims to include "or equal to." For example, "greater than 4.0" may be interpreted as, and subsequently modified in the claims as "greater than or equal to 4.0."

EXAMPLES

Example 1

Cerium doped YAG (Ce:YAG) powder was synthesized with a dopant concentration of 2.58 wt % $CeO_2$.

71.33 g yttria (99.9% purity, Y-104, Materion), 0.313 g fumed silica (Sigma-Aldrich), and 3.225 g ceria (99.9% purity, C-1064, Materion) were introduced as a batch to an Abbethane (Paul O'Abbe) 1.6 gal polyurethane inner lined milling jar to form a powder mixture. To the milling jar, 756.4 g of alumina grinding media (97.7% purity, ~13 mm diameter X ~13 mm height) and 300 ml of de-ionized water were also added to form a powder slurry. The weight percent of silica for Example 1 was 0.25 wt % based upon the total weight of the powder mixture. The powder slurry was then ball milled for 16 hours at 60 RPM.

Figure 2:
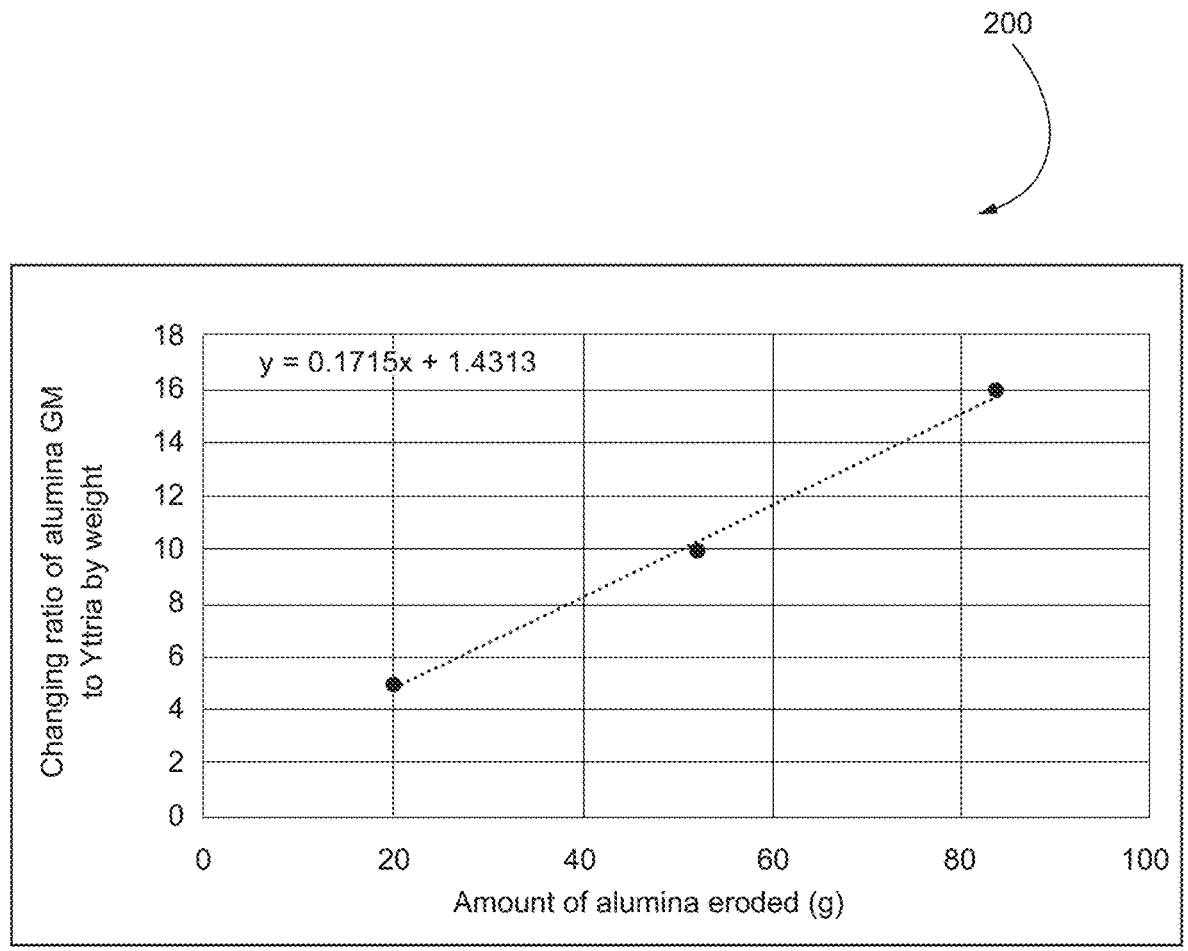
FIG. 2 is a graph showing the amount of alumina eroded as a function of the charging ratio of alumina grinding media to yttria by weight according to an exemplary process.

After the ball milling, the powder slurry was sieved by using a polyethylene sieve (mesh #230) to separate the alumina grinding media as well as the coarse particulate from the powder slurry. The alumina grinding media was dried in a drying oven and the weight was again measured. The alumina grinding media after the ball milling weighed 700.1 g and the amount of the alumina eroded from the grinding media was calculated as 56.3 g. Plot 200 of FIG. 2 illustrates the amount of alumina eroded from alumina grinding media during ball milling, where the amount of alumina eroded from the grinding media is shown as a function of charging ratio of alumina grinding media to yttria by weight. Without consideration of the amount of dopant and fumed silica, the yttria and alumina constituents in the powder slurry provide the $3Y_2O_3:5Al_2O_3$ stoichiometric YAG (71.33 g of yttria and 53.67 g of alumina) with an additional 2.63 g of alumina. The ratio of yttria to alumina ($Y_2O_3: Al_2O_3$) in the powder slurry by mole was calculated to be 3 to 5.25 (0.57:1).

The powder slurry further included 8 g of acrylic polymer based binder (B-60A, Rohm and Hass), which was stirred into the powder slurry for 30 min using a magnetic bar and a magnetic stirrer. The powder slurry was then spray dried by using a Yamato DL410 spray dryer at an inlet temperature of 240° C., an outlet temperature of 90° C., and air pressure of 0.1 MPa. The spray dried powder slurry was passed through a 325 meshed polyethylene sieve to form a granulated powder ready for compaction.

The granulated powder was then compacted into green compacts, which were formed into grinding media shapes (0.75 inch diameter×0.75 inch height) by the Hydramet uniaxial press. The density of the green compacts was 1.49 g/cm³ or the equivalent of 32.7% of theoretical density of the YAG.

The calcining was conducted using the following heat treatment schedule: heated to a temperature of 500° C. and held for 1 hour to remove the organic binder (binder burnout hold), raised to a temperature of 1525° C. and held for 8 hours for calcining, and then raised to a temperature to 1550° C. and held for 8 hours for further calcining in a single cycle. The density of the calcined compact was 2.21g/cm³ or the equivalent of 48.6% of theoretical density of the YAG. All de-binding and calcining of the green compacts were performed in air atmosphere.

The calcined compacts in 300 ml of ethanol were milled for 6 hours at 60 RPM and then sieved by a 230 mesh polyethylene sieve. The milled slurry was dried in a drying oven temperature at 90° C. for overnight (>12 hours). After drying, the YAG powder was passed through a 325 meshed polyethylene sieve.

Figure 3:
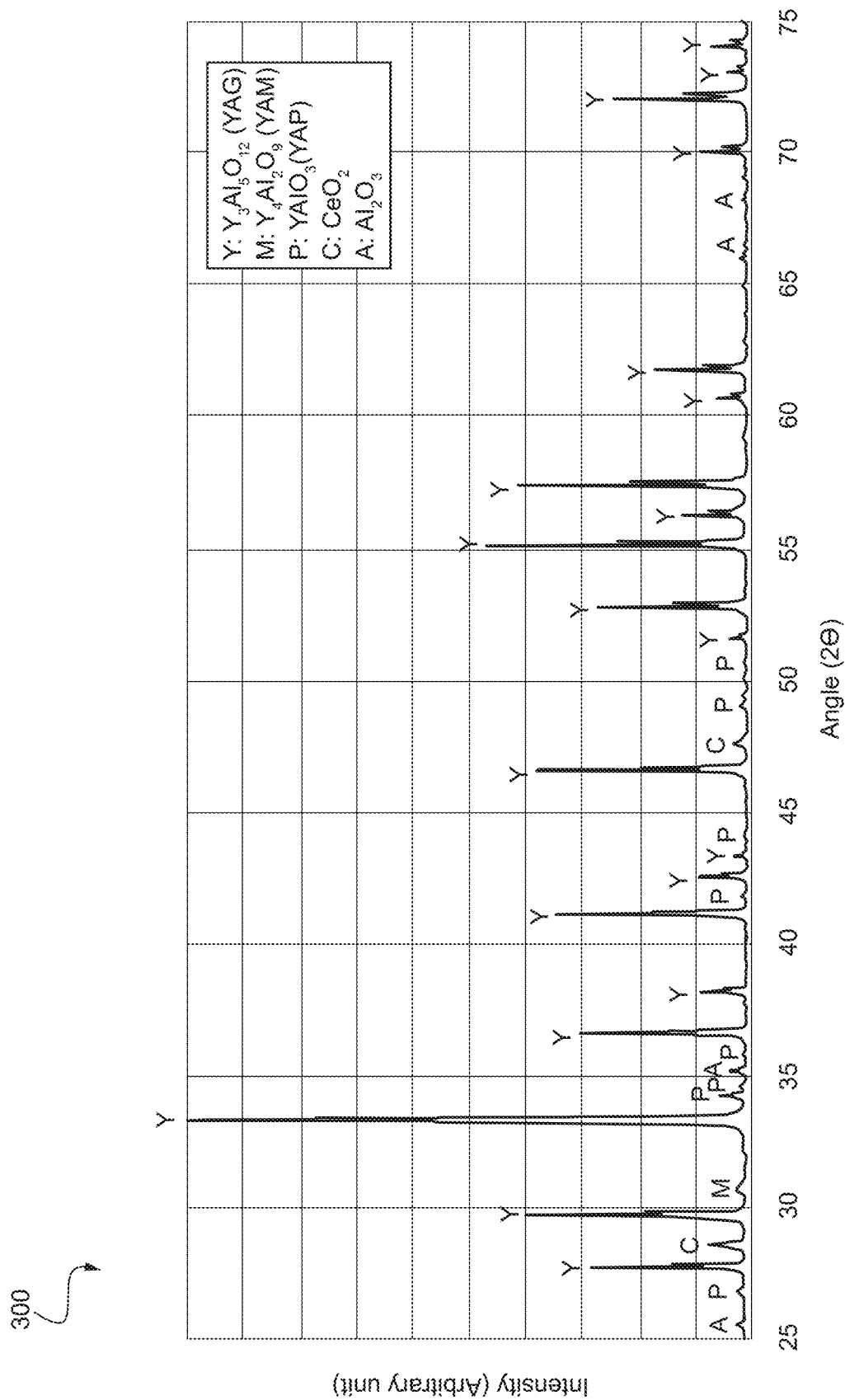
FIG. 3 is an x-ray diffraction plot for a YAG powder doped with ceria according to the exemplary process.

FIG. 3 illustrates an x-ray diffraction pattern for the resultant YAG powder of Example 1. Plot 300 shows the major phase being YAG with peaks indicated by a 'Y'. Minor phases detected as indicated by the peaks of lessor intensity include $Y_4Al_2O_9$ (YAM) with peaks indicated by a 'M', $YAlO_3$ (YAP) with peaks indicate by a 'P', ceria with peaks indicated by a 'C', and alumina with peaks indicated by a 'A'. This is beneficially a high YAG content, as compared to the YAG formed from a conventional solid state sintering processes. The YAG phase content was estimated at about 92 wt % $Y_3Al_5O_{12}$.

Figure 4:
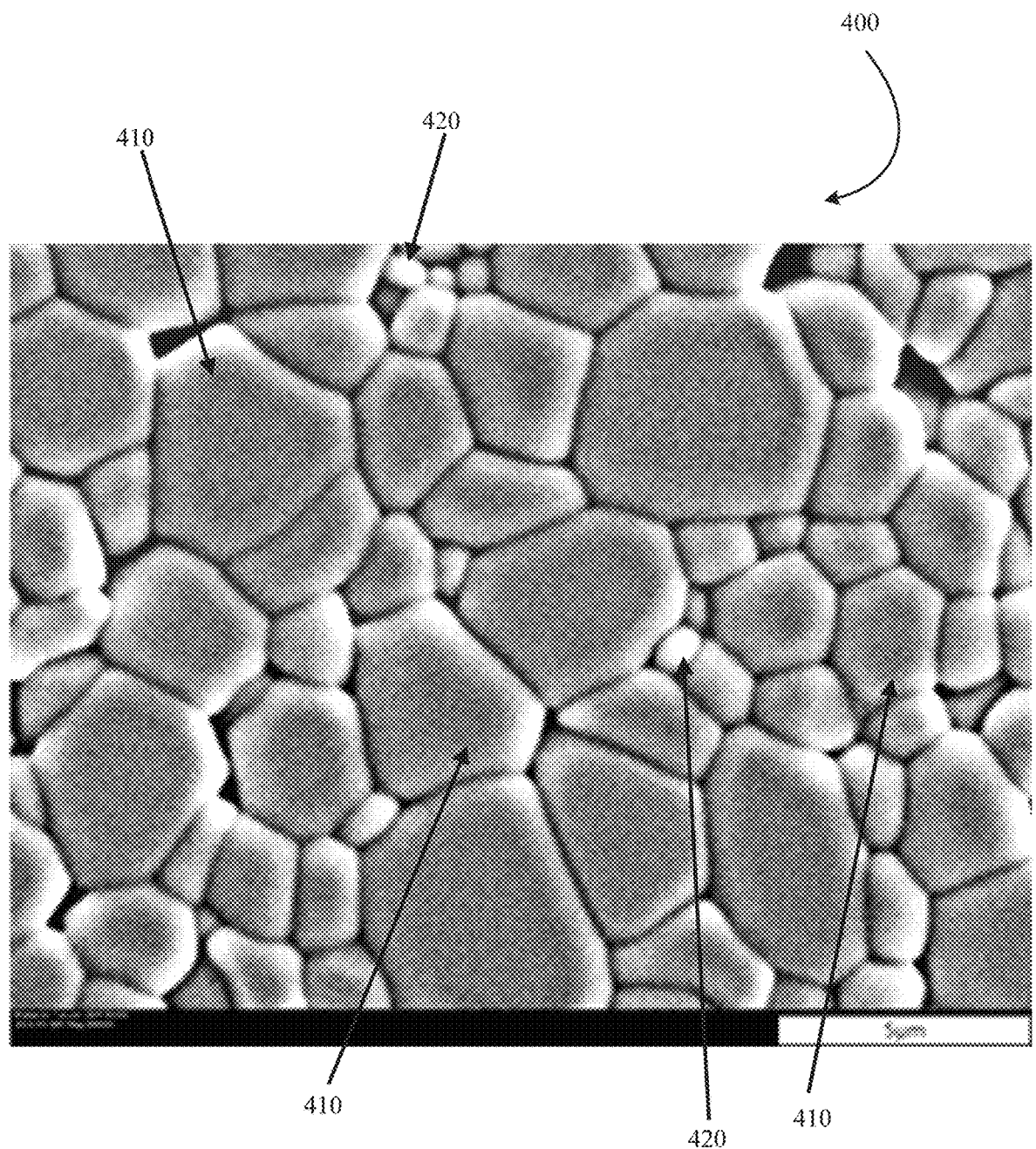
FIG. 4 is a scanning electron microscope (SEM) image of a cerium doped YAG powder according to an exemplary process, e.g., after sintering at 1500° C. for 8 hours in air.

To evaluate the sinterability of the synthesized YAG, the YAG powders were then mixed with 0.25 wt. % of fumed silica and compacted by a uni-axial press, then sintered at 1500° C. for 8 hours in air to yield a sintered dense compact (as shown in FIG. 4).

FIG. 4 is a scanning electron microscope (SEM) image 400 showing a typical microstructure for the YAG powder synthesized as in Example 1 having a dopant concentration of 2.58 wt. % $CeO_2$ after sintering at 1500° C. for 8 hours in air. The composition of the powder is stoichiometric YAG with additional 2.13 wt % of alumina (without consideration of cerium oxide). The sintered dense YAG ceramic was measured to have a density of 4.41 g/cm³, which is equivalent to 97% of theoretical density. As shown in image 400, the sintered YAG 400 includes YAG grains 410 with sub-micron spheroidal $CeO_2$ grains 420 at some grain boundaries. Advantageously, no alumina grains were present in image 400.

Example 2

Undoped YAG (YAG) powder was synthesized. The batch included 71.33 g yttria (99.9%, Y-104, Materion) and 0.31 g fumed silica (Sigma-Aldrich), as in Example 1 but without $CeO_2$ additions. The weight percent of silica for Example 2 was 0.25 wt % based upon the total weight of the powder mixture. This powder was synthesized to target a 0.25 wt % hyper alumina YAG composition. The ratio of yttria to alumina ($Y_2O_3$: $Al_2O_3$) in the powder slurry by mole was calculated to be 3 to 5 (0.6:1). The heat treatment schedule for the green compact was as follows: heated to a temperature of 500° C. and held for 1 hour to remove the organic binder, raised to a temperature of 1525° C. and held for 8 hours for calcining, and then raised to a temperature to 1550° C. for 8 hours of further calcining. All heat treatments were all performed in air. The density of the calcined compact was about 50% of theoretical density of the YAG. The XRD plot (not shown) after heat treatment of Example 2 was similar to FIG. 3 but without the peaks for the $CeO_2$ phase. Intermediate phases YAP and YAM were observed. Alumina was not detected as a minor phase.

The resultant powder of Example 2 was then re-calcined by repeating the calcining heat treatment schedule for a second cycle: at a temperature of 1525° C. and held for 8 hours, and then raised to a temperature to 1550° C. for 8 hours. Calcining a second cycle does not affect the density of the compact significantly and was about 50% of theoretical density of the YAG after the second calcining cycle.

Figure 5:
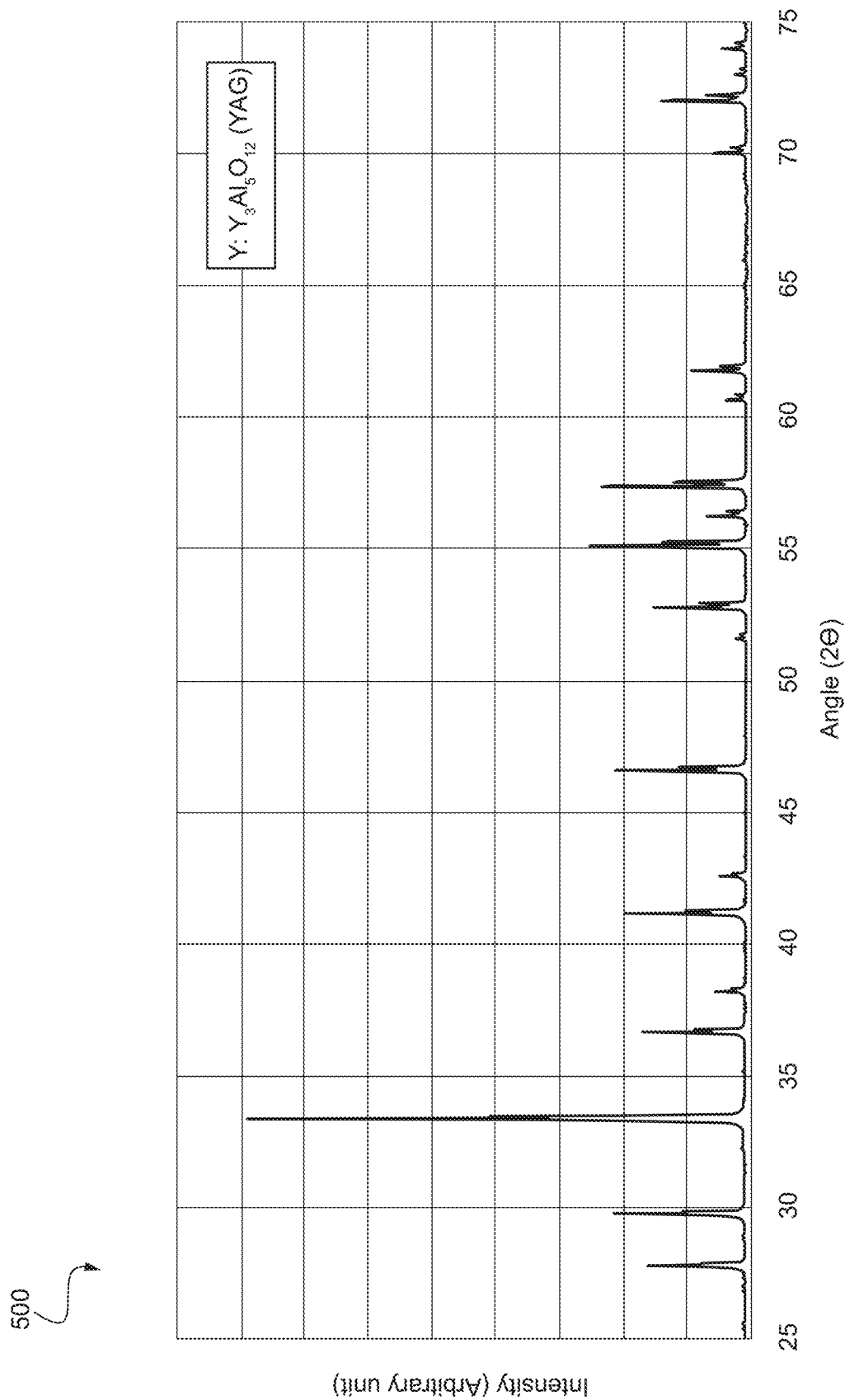
FIG. 5 is an x-ray diffraction plot for an undoped YAG powder after repeated calcination cycles according to an exemplary process.

Any and all intermediate phases (YAP and YAM) were then transformed into pure YAG as shown in FIG. 5, which illustrates the x-ray diffraction pattern for the resultant YAG powder of Example 2 after two calcining cycles. Thus, re-calcined Example 2 shows the presence of only YAG phase (no minor phases) indicative of complete phase transformation to YAG.

Comparative A

Figure 6:
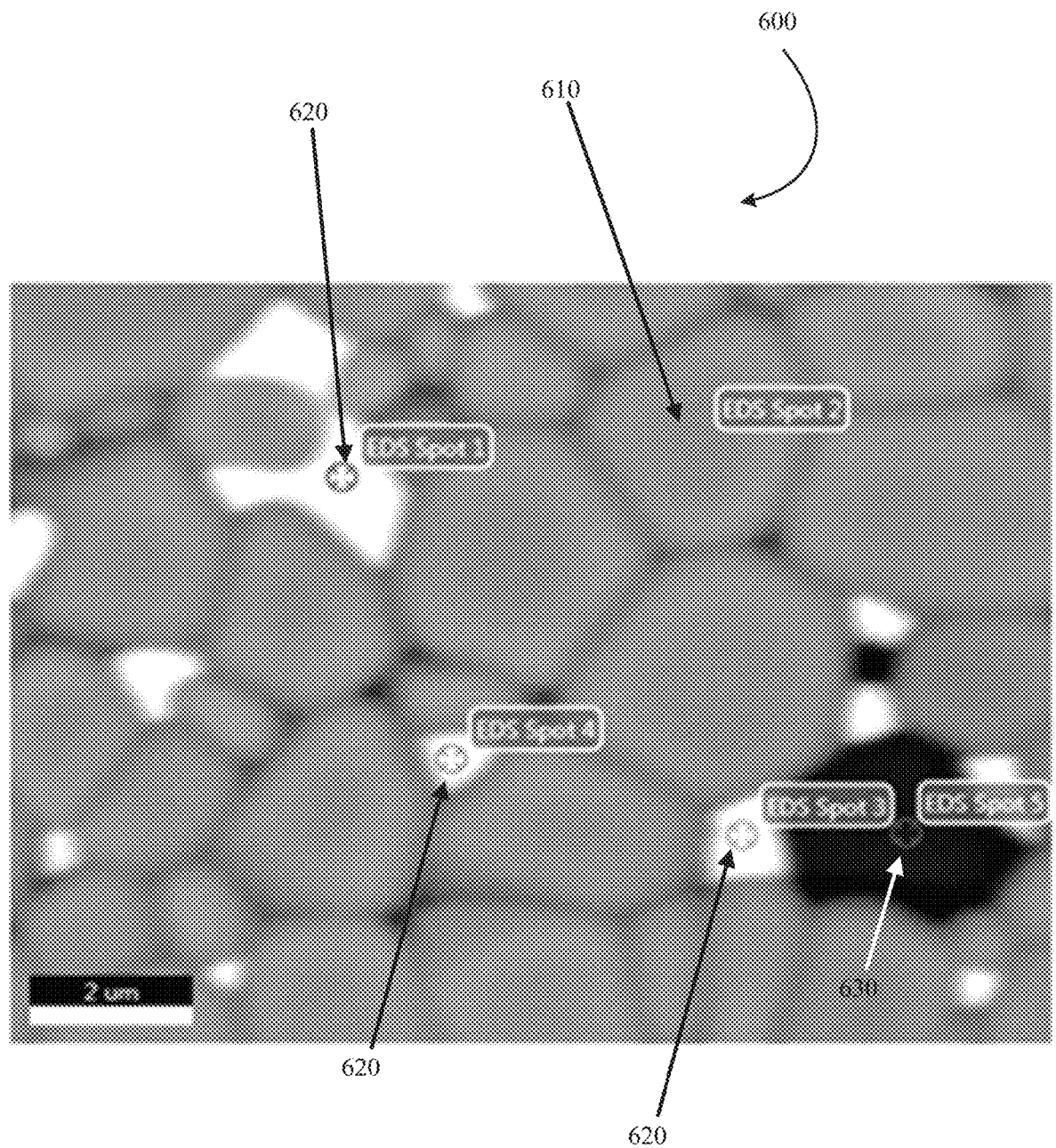
FIG. 6 is an SEM image showing spot energy dispersive spectroscopy (EDS) analysis at various spots for a comparative cerium doped YAG powder, e.g., after sintering at 1600° C. for 8 hours in air.

Cerium doped YAG (Ce:YAG) powder was prepared by in situ sintering of a conventional, commercial yttria and alumina powder mixture, with a dopant concentration of 3.0 wt % $CeO_2$. The composition of the powder was stoichiometric YAG with an additional 12 wt % of alumina (without consideration of cerium oxide). FIG. 6 is an SEM image 600 showing spot energy dispersive spectroscopy (EDS) analysis at various spots for the YAG powder of Comparative A after sintering 1600° C. for 8 hours in air, which yielded a density of 4.43 g/cm³, equivalent to 97% of theoretical density. Importantly, this comparative sample required a significantly higher sintering temperature to achieve the same density as in Example 1. Further, Comparative A included a high content of alumina as a minor phase, which is not desirable as it affects the purity and transparency properties of the YAG article. Minor phases included alumina and ceria, in the amounts of about 12 wt % and 3 wt %, respectively.

EDS analysis results were collected at five positions as shown in FIG. 6. Table 1 summarizes Comparative A's EDS results. Based on the EDS analysis, the phases of YAG 610, ceria 620, and alumina 630 were confirmed. Thus, Comparative A contains alumina phase as a minor oxide phase, whereas Example 1 and (re-calcined) Example 2 do not.

TABLE 1

| EDS Spots | Grain Appearance | Element Compositions (atomic %) | | | | | Phases** | |
|---|---|---|---|---|---|---|---|---|
| | | C* | O | Al | Y | Ce | Major | Minor |
| 1 | White | 28.65 | 38.80 | 18.0 | 5.29 | 9.28 | YAG, Ceria | *** |
| 2 | Gray | 28.44 | 39.87 | 22.2 | 9.52 | — | YAG | *** |
| 3 | White | 28.44 | 38.50 | 19.6 | 5.73 | 7.75 | YAG, Ceria | *** |
| 4 | White | 28.07 | 37.78 | 21.0 | 7.42 | 5.70 | YAG, Ceria | *** |
| 5 | Black | 21.00 | 44.56 | 31.2 | 3.24 | — | Alumina | YAG |

*From carbon coatings on specimen for electron discharging
**Calculated from the element composition
*** Oxygen deficient alumina Examples 3 and 4, Comparatives B and C In order to compare effects of different calcining heat treatments (varying by temperature and/or time and/or number of cycles) on yielded phases, a scaled up (375 g target) batch of undoped powder as prepared in Example 2 was synthesized starting with 214 g of yttria and 0.938 g of fumed silica. As with Examples 1 and 2, the weight percent of silica for the scaled up batch was 0.25 wt % based upon the total weight of the powder mixture. The alumina was introduced similarly as in Examples 1 and 2 through wearing of the alumina grinding media during milling. This powder was synthesized to target a stoichiometric YAG composition with 1.1 wt % excess alumina. The ratio of yttria to alumina ($Y_2O_3$: $Al_2O_3$) in the powder slurry by mole was calculated to be 3 to 5.13 (0.58:1).

Examples 3-4 and Comparatives B and C were formed into green compacts. The average densities (for at least five sample compacts per example and as a percentage of theoretical density) before and after calcining are shown in Table 2.

All green compacts were heated to a temperature of 500° C. and held for 1 hour for binder burnout, in other words to remove the organic binder.

Examples 3-4 and Comparatives B and C were then calcined at different heat treatment conditions:

Example 3 calcining cycle—raised to a temperature of 1525° C. and held for 8 hours for calcining, and then raised to a temperature to 1550° C. for 8 hours of further calcining in air in a single cycle;

Comparative B calcining cycle—raised to a temperature of 1475° C. and held for 8 hours for calcining in air;

Comparative C calcining cycle—raised to a temperature to 1525° C. and held for 8 hours for calcining in air; and, Example 4 included compacts heat treated according to Comparative C (with the calcining cycle as described above), which were then calcined at 1550° C. and held for 8 hours in an addition calcining cycle for calcining in air.

Phases present as determined by x-ray diffraction analysis were compared for Example 3, Example 4, and Comparatives B and C. Table 2 also includes data for re-calcined Example 2. Re-calcined Example 2 underwent two cycles of the calcining heat treatment, where each cycle includes 1525° C. for 8 h and 1550° C. for 8h. The XRD data is summarized in Table 2 as to content of YAG and other phases (if present). Other phases can include, e.g., YAP, YAM, and alumina. Phases present for Example 3 was estimated. Relative densities (average of at least five sample compacts per example as a percentage of theoretical density) after calcining heat treatments are also summarized in Table 2. Relative densities are not applicable for Example 4, having been synthesized already in powder form.

TABLE 2

| Example | Relative Density (%) Green Compacts (Avg) | Calcining Heat Treatment Cycle | Relative Density (%) Calcined Compacts (Avg) | Phases Present (wt %) YAG | Other |
|---|---|---|---|---|---|
| 2 | ~35 | 1525° C./8 h + 1550° C./8 h (First Cycle) 1525° C./8 h + 1550° C./8 h (Second Cycle) | ~50 | 100**** | 0 |
| 3 | 34.29 | 1525° C./8 h + 1550° C./8 h (Single Cycle) | 49.78 | ~92 | ~8 |
| 4 | N/A | Comp C (1525° C./8 h) (First Cycle) 1550° C./8 h (Second Cycle) | N/A | 94.0 | 6.0 |
| Comp B | 35.36 | 1475° C./8 h (Single Cycle) | 46.42 | 65.3 | 34.7 |
| Comp C | 35.12 | 1525° C./8 h (Single Cycle) | 47.65 | 75.2 | 24.8 |

****Data from re-calcined Example 2 x-ray diffraction plot as in FIG. 5 (two calcining cycles).

Calcining according to Example 2 provided the purest resultant YAG powder (complete transformation to $Y_3Al_5O_{12}$ with no minor phases detected) and included first and second calcining cycles of 1525° C. for 8 h and 1550° C. for 8 h. Example 4, which included a first calcining cycle 1525° C. for 8 h and a second calcining cycle 1550° C. for 8 h, also yields a high YAG transformation with a phase content of at least 94 wt % $Y_3Al_5O_{12}$. Calcining according to Example 3 at 1525° C./8 h+1550° C./8 h in a single calcining cycle yields a high YAG transformation with a phase content of at least 92 wt % $Y_3Al_5O_{12}$.

Comparatives B and C demonstrated an unacceptable amount of non-YAG phases indicating transformation to YAG was not yet complete. Comparative B demonstrated a phase content of only about 65 wt % $Y_3Al_5O_{12}$ and Comparative C, with a higher calcining temperature than Comparative B, demonstrated a phase content of only about 75 wt % $Y_3Al_5O_{12}$.

Embodiments

The following embodiments are contemplated. All combinations of features and embodiments are contemplated.

Embodiment 1: a process of synthesizing a yttrium aluminum garnet (YAG) powder, the process comprising introducing powders of yttria and silica to form a powder mixture, wherein alumina is not added to the powder mixture; and ball milling the powder mixture in the presence of an alumina grinding media and a solvent to form a powder slurry; spray drying the powder slurry to form a spray dried powder; compacting the spray dried powder to 35% or less theoretical density to form a green compact, calcining the green compact in air to 50% or less theoretical density to form a YAG compact; and, milling the YAG compact, without a grinding media, and then drying to produce the YAG powder.

Embodiment 2: the process of any previous or subsequent embodiment, wherein mixing powders further includes a dopant comprising a lanthanide or transitional metal.

Embodiment 3: the process of any previous or subsequent embodiment, wherein the lanthanide or transitional metal is in the form of a compound, wherein the compound is an oxide, a hydrate, a nitrate, a chloride, or combinations thereof.

Embodiment 4: the process of any previous or subsequent embodiment, wherein the lanthanide or transitional metal is ionized to +3 and has an ionic radius equal to or less than 0.114 nm.

Embodiment 5: the process of any previous or subsequent embodiment, wherein the lanthanide or transitional metal comprises scandium, titanium, vanadium, chromium, manganese, iron, cobalt, nickel, copper, zinc, zirconium, niobium, molybdenum, technetium, ruthenium, rhodium, palladium, silver, cadmium, lanthanum, cerium, praseodymium, neodymium, promethium, samarium, europium, gadolinium, terbium, dysprosium, holmium, erbium, thulium, ytterbium, lutetium, or combinations thereof.

Embodiment 6: the process of any previous or subsequent embodiment, wherein the lanthanide or transitional metal is scandium, zinc, or cerium.

Embodiment 7: the process of any previous or subsequent embodiment, wherein the dopant comprises from 10 ppm to 6 wt % based upon the total weight of the powder mixture.

Embodiment 8: the process of any previous or subsequent embodiment, wherein the dopant is from 0.1 wt % to 5 wt % ceria based upon the total weight of the powder mixture.

Embodiment 9: the process of any previous or subsequent embodiment, wherein the dopant is less than 3 wt % ceria based upon the total weight of the powder mixture.

Embodiment 10: the process of any previous or subsequent embodiment, wherein the compound is ceria ($CeO_2$), cerium (III) chloride heptahydrate ($CeCl_3 \cdot 7H_2O$), or cerium (III) nitrate hexahydrate ($Ce(NO_3)_3 \cdot 6H_2O$).

Embodiment 11: the process of any previous or subsequent embodiment, wherein the yttria powder has of purity 2N or higher.

Embodiment 12: the process of any previous or subsequent embodiment, wherein the yttria powder has of purity 3N or higher.

Embodiment 13: the process of any previous or subsequent embodiment, wherein the silica is from 0.2 wt % to 0.3 wt % based upon the total weight of the powder mixture.

Embodiment 14: the process of any previous or subsequent embodiment, wherein the silica is fumed silica.

Embodiment 15: the process of any previous or subsequent embodiment, wherein the alumina grinding media has a purity from 95.0 to 99.8% $Al_2O_3$.

Embodiment 16: the process of any previous or subsequent embodiment, wherein ball milling the powder slurry includes the powder mixture, solvent, and the alumina grinding media being contained in a polymer lined ball milling vessel.

Embodiment 17: the process of any previous or subsequent embodiment, wherein the solvent is distilled water or deionized water.

Embodiment 18: the process of any previous or subsequent embodiment, further including adding an organic binder to the powder slurry and mixing prior to spray drying the powder slurry.

Embodiment 19: the process of any previous or subsequent embodiment, wherein the organic binder is water soluble.

Embodiment 20: the process of any previous or subsequent embodiment, wherein the organic binder is from 3 wt % to 9 wt % based upon the total weight of the powder slurry.

Embodiment 21: the process of any previous or subsequent embodiment, wherein the composition after ball milling includes stoichiometric $3Y_2O_3:5Al_2O_3$ (0.6:1) and less than 3 wt % additional $Al_2O_3$.

Embodiment 22: the process of any previous or subsequent embodiment, wherein the additional $Al_2O_3$ includes an eroded portion of the alumina grinding media.

Embodiment 23: the process of any previous or subsequent embodiment, wherein compacting the spray dried powder includes uni-axial pressing or cold isostatic pressing.

Embodiment 24: the process of any previous or subsequent embodiment, wherein compacting the spray dried powder is performed at room temperature in air.

Embodiment 25: the process of any previous or subsequent embodiment, wherein compacting the spray dried powder is performed at a pressure from 500 psi to 1250 psi.

Embodiment 26: the process of any previous or subsequent embodiment, wherein calcining is performed at a temperature of from 1100° C. to 1650° C.

Embodiment 27: the process of any previous or subsequent embodiment, wherein calcining is performed at a temperature of from 1450° C. to 1550° C.

Embodiment 28: the process of any previous or subsequent embodiment, wherein calcining is performed for a time of from 2 hours to 64 hours.

Embodiment 29: the process of any previous or subsequent embodiment, wherein calcining is performed for a time of from 8 hours to 16 hours.

Embodiment 30: the process of any previous or subsequent embodiment, wherein milling the YAG compact includes the compact and a solvent being contained in a polymer lined milling vessel.

Embodiment 31: the process of any previous or subsequent embodiment, wherein the solvent is ethanol alcohol or isopropyl alcohol.

Embodiment 32: the process of any previous or subsequent embodiment, wherein milling the YAG compact includes milling for at least 6 hours.

Embodiment 33: the process of any previous or subsequent embodiment, wherein milling the YAG compact includes autogenous crushing of YAG compact material upon itself to produce the YAG powder having an average particle size distribution of less than 100 µm.

Embodiment 34: the process of any previous or subsequent embodiment, wherein the average particle size distribution is less than 63 µm.

Embodiment 35: the process of any previous or subsequent embodiment, wherein the average particle size distribution is less than 44 µm.

Embodiment 36: the process of any previous or subsequent embodiment, wherein the milled YAG compact material is sieved before drying.

Embodiment 37: the process of any previous or subsequent embodiment, wherein the YAG powder has a bimodal particle size distribution.

Embodiment 38: the process of any previous or subsequent embodiment, wherein drying is performed at a temperature less than 90° C.

Embodiment 39: a process of synthesizing a doped yttrium aluminum garnet (YAG) powder, the process comprising: providing powders of yttria, silica, and at least one dopant formed of an oxide, a hydrate, a nitrate, or a chloride of a lanthanide or transitional metal and mixing to form a powder mixture, wherein alumina is not added to the powder mixture; and ball milling the powder mixture in the presence of an alumina grinding media and a solvent to form a powder slurry; adding an organic binder to the powder slurry and mixing to form a sprayable powder slurry; spray drying the sprayable powder slurry to form a spray dried powder; compacting the spray dried powder to 35% or less theoretical density to form a green compact, calcining the green compact in air to 50% or less theoretical density to form a YAG compact; and milling the YAG compact, without a grinding media, and then drying to produce a doped YAG powder.

Embodiment 40: a yttrium aluminum garnet (YAG) composition comprising: $Y_3Al_5O_{12}$; and less than 3 wt % additional $Al_2O_3$, wherein the additional $Al_2O_3$ includes an eroded portion of an alumina grinding media.

Embodiment 41: the composition of any previous or subsequent aspect, further including a dopant concentration of at least 1 at %.

Embodiment 42: a phosphor wheel or LED lighting comprising the composition of any previous aspect.

Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function.

The singular forms "a," "an," and "the" include plural referents unless the context clearly dictates otherwise.

As used in the specification and in the claims, the term "comprising" may include the embodiments "consisting of" and "consisting essentially of." The terms "comprise(s)," "include(s)," "having," "has," "can," "contain(s)," and variants thereof, as used herein, are intended to be open-ended transitional phrases, terms, or words that require the presence of the named ingredients/components/steps and permit the presence of other ingredients/components/steps. However, such description should be construed as also describing compositions, articles, or processes as "consisting of" and "consisting essentially of" the enumerated ingredients/components/steps, which allows the presence of only the named ingredients/components/steps, along with any impurities that might result therefrom, and excludes other ingredients/components/steps.

Numerical values in the specification and claims of this application should be understood to include numerical values which are the same when reduced to the same number of significant figures and numerical values which differ from the stated value by less than the experimental error of conventional measurement technique of the type described in the present application to determine the value.

All ranges disclosed herein are inclusive of the recited endpoint and independently combinable (for example, the range of "from 2 grams to 10 grams" is inclusive of the endpoints, 2 grams or 10 grams, and all the intermediate values).

When a material is described as having an average particle size or average particle size distribution, which is defined as the particle diameter at which a cumulative percentage of 50% (by volume) of the total number of particles are attained. In other words, 50% of the particles have a diameter above the average particle size, and 50% of the particles have a diameter below the average particle size. The size distribution of the particles will be Gaussian, with upper and lower quartiles at 25% and 75% of the stated average particle size, and all particles being less than 150% of the stated average particle size.

The process steps described herein refer to temperatures, and, unless provided for, this refers to the temperature attained by the material that is referenced, rather than the temperature at which the heat source (e.g. furnace, oven) is set. The term "room temperature" refers to a range of from 20° C. to 25° C. (68° F. to 77° F.).

The term "about" can be used to include any numerical value that can vary without changing the basic function of that value. When used with a range, "about" also discloses the range defined by the absolute values of the two endpoints, e.g. "about 2 to about 4" also discloses the range "from 2 to 4." The term "about" may refer to plus or minus 10% of the indicated number.

While the invention has been described in detail, modifications within the spirit and scope of the invention will be readily apparent to those of skill in the art. In view of the foregoing discussion, relevant knowledge in the art and references discussed above in connection with the Background and Detailed Description, the disclosures of which are all incorporated herein by reference. In addition, it should be understood that aspects of the invention and portions of various embodiments and various features recited below and/or in the appended claims may be combined or interchanged either in whole or in part. In the foregoing descriptions of the various embodiments, those embodiments which refer to another embodiment may be appropriately combined with other embodiments as will be appreciated by one of skill in the art. Furthermore, those of ordinary skill in the art will appreciate that the foregoing description is by way of example only, and is not intended to limit.

We claim:

1. A process of synthesizing a yttrium aluminum garnet (YAG) powder, the process comprising:
   introducing yttria and silica powders to form a powder mixture, wherein alumina is not added to the powder mixture; and
   ball milling the powder mixture in the presence of an alumina grinding media and a solvent to form a powder slurry;
   processing the powder slurry to form a green compact;
   calcining, at a temperature of from 1100° C. to 1650° C. for greater than 8 hours, the green compact in air to 50% or less theoretical density to form a yttrium aluminum garnet compact of at least 92 wt % $Y_3Al_5O_{12}$; and,
   milling the yttrium aluminum garnet compact, without a grinding media, and then drying to produce the yttrium aluminum garnet powder.

2. The process of claim 1, wherein processing includes spray drying the powder slurry to form a spray dried powder and compacting the spray dried powder to 35% or less theoretical density to form a green compact.

3. The process of claim 1, wherein calcining is performed at a temperature of from 1450° C. to 1550° C. for a time of from 8 hours to 16 hours.

4. The process of claim 1, wherein the yttrium aluminum garnet powder is sinterable to greater than 96% theoretical density.

5. The process of claim 1, wherein the alumina grinding media has a purity from 95.0 to 99.8% $Al_2O_3$, and wherein the composition after ball milling includes stoichiometric $3Y_2O_3:5Al_2O_3$ and less than 3 wt % additional $Al_2O_3$.

6. The process of claim 5, wherein the additional $Al_2O_3$ includes an eroded portion of the alumina grinding media.

7. The process of claim 1, wherein milling the yttrium aluminum garnet compact includes autogenous crushing of yttrium aluminum garnet compact material upon itself to produce the yttrium aluminum garnet powder having an average particle size distribution of less than 100 μm.

8. The process of claim 1, wherein introducing powders further includes a dopant comprising a lanthanide or transitional metal, wherein the lanthanide or transitional metal is in the form of a compound.

9. The process of claim 8, wherein the compound is an oxide, a hydrate, a nitrate, a chloride, or combinations thereof.

10. The process of claim 8, wherein the lanthanide or transitional metal is ionized to +3 and has an ionic radius equal to or less than 0.114 nm.

11. The process of claim 8, wherein the lanthanide or transitional metal comprises scandium, titanium, vanadium, chromium, manganese, iron, cobalt, nickel, copper, zinc, zirconium, niobium, molybdenum, technetium, ruthenium, rhodium, palladium, silver, cadmium, lanthanum, cerium, praseodymium, neodymium, promethium, samarium, europium, gadolinium, terbium, dysprosium, holmium, erbium, thulium, ytterbium, lutetium, or combinations thereof.

12. The process of claim 8, wherein the lanthanide or transitional metal is scandium, zinc, or cerium.

13. The process of claim 8, wherein the compound is ceria ($CeO_2$), cerium (III) chloride heptahydrate ($CeCl_3 \cdot 7H_2O$), or cerium (III) nitrate hexahydrate ($Ce(NO_3)_3 \cdot 6H_2O$).

14. The process of claim 8, wherein the dopant is from 10 ppm to 6 wt % based upon the total weight of the powder mixture.

15. The process of claim 8, wherein the dopant is from 0.1 wt % to 5 wt % ceria based upon the total weight of the powder mixture.

16. The process of claim 11, wherein the dopant is less than 3 wt % ceria based upon the total weight of the powder mixture.

17. The process of claim 1, wherein the yttria powder has of purity 2N or higher.

18. The process of claim 1, wherein the silica is from 0.1 wt % to 0.3 wt % based upon the total weight of the powder mixture.

19. A process of synthesizing a doped yttrium aluminum garnet (YAG) powder, the process comprising:
   introducing powders of yttria, silica, and at least one dopant formed of an oxide, a hydrate, a nitrate, or a chloride of a lanthanide or transitional metal and mixing to form a powder mixture, wherein alumina is not added to the powder mixture; and
   ball milling the powder mixture in the presence of an alumina grinding media and a solvent to form a powder slurry;
   processing the powder slurry to form a green compact;
   calcining, at a temperature of from 1100° C. to 1650° C. for greater than 8 hours, the green compact in air to 50% or less theoretical density to form a yttrium aluminum garnet compact of at least 92 wt % $Y_3Al_5O_{12}$; and,
   milling the yttrium aluminum garnet compact, without a grinding media, and then drying to produce the doped yttrium aluminum garnet powder.

* * * * *